United States Patent [19]

Payne

[11] Patent Number: 4,639,578
[45] Date of Patent: Jan. 27, 1987

[54] TEMPERATURE SENSOR FAILURE DETECTION SYSTEM FOR COOKING APPLIANCE

[75] Inventor: Thomas R. Payne, Louisville, Ky.

[73] Assignee: General Electric Company, Louisville, Ky.

[21] Appl. No.: 816,615

[22] Filed: Jan. 6, 1986

[51] Int. Cl.[4] .............................................. H05B 1/02
[52] U.S. Cl. .................................... 219/450; 219/494; 219/449
[58] Field of Search ............... 219/450, 448, 449, 494, 219/452, 453, 451, 445, 446, 447, 459, 489, 492, 219/518; 236/20 A; 126/374, 39G

[56] References Cited

U.S. PATENT DOCUMENTS

| | | | |
|---|---|---|---|
| 3,883,753 | 5/1975 | Harrison | 219/494 |
| 4,126,041 | 11/1978 | Doi et al. | 73/295 |
| 4,197,581 | 4/1980 | Watrous | 219/494 |
| 4,320,285 | 3/1982 | Koether | 219/494 |
| 4,343,990 | 8/1982 | Ueda | 219/492 |
| 4,432,210 | 2/1984 | Saito | 62/126 |
| 4,437,159 | 3/1984 | Waugh | 364/400 |
| 4,493,980 | 1/1985 | Payne et al. | 219/450 |
| 4,504,922 | 3/1985 | Johnson et al. | 364/557 |

Primary Examiner—E. A. Goldberg
Assistant Examiner—Teresa J. Walberg
Attorney, Agent, or Firm—H. Neil Houser; Radford M. Reams

[57] ABSTRACT

A power control arrangement for a cooking appliance equipped with an automatic surface unit, the energization of which under normal operating conditions is controlled in accordance with a closed loop control strategy as a function of the sensed utensil temperature and the user selected temperature setting. The control arrangement is operative to detect a failure of the sensor circuit for the automatic surface unit and operative upon detection of such a failure to control energization of the surface unit in accordance with an open loop control strategy only as a function of the user selected setting. A user discernible signal is provided alerting the user to the sensor circuit failure. By this arrangement the user is informed of the malfunction and is able to use the automatic surface unit as a standard surface unit until the failure can be repaired.

20 Claims, 20 Drawing Figures

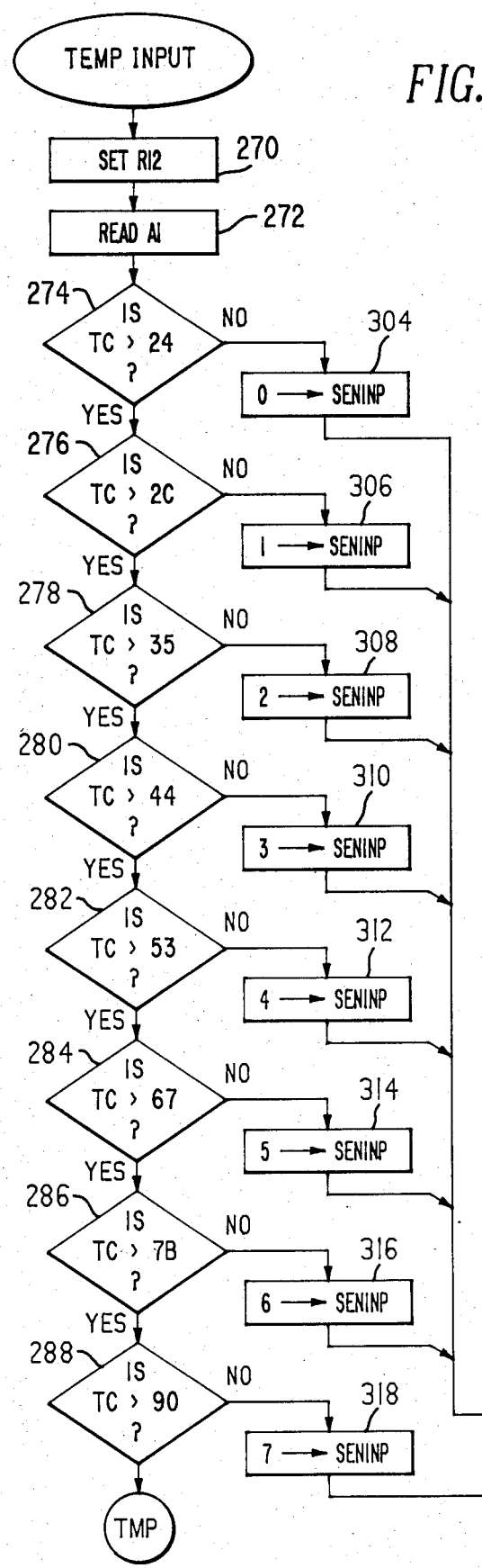
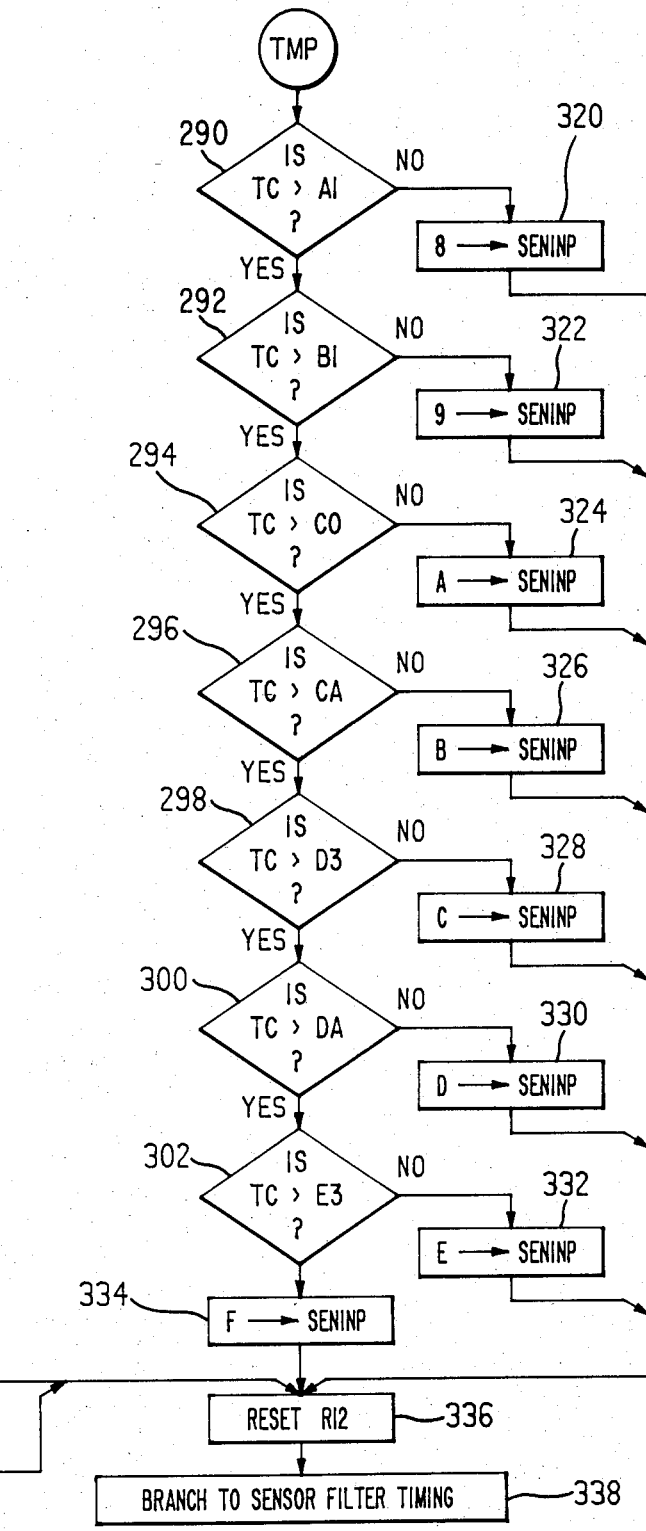
FIG. 8

TEMPERATURE SENSOR FAILURE DETECTION SYSTEM FOR COOKING APPLIANCE

BACKGROUND OF THE INVENTION

This invention relates generally to method and apparatus applicable to a cooking appliance incorporating an automatic surface unit, and more particularly to method and apparatus for detecting a surface unit temperature sensor failure in such an appliance and modifying the mode of operation of the automatic surface unit accordingly.

An automatic surface unit is equipped with a temperature sensor for sensing the temperature of the utensil being heated by the surface unit and a controller for controlling the energization of the surface unit as a function of the sensed utensil temperature. Such surface units are well known in the art. Typically, such surface units include a temperature sensing device such as a bi-metallic device or a thermistor device mounted to be in thermal contact with the utensil. When the sensed temperature is less than a predetermined threshold temperature set by a user manipulation of input control knobs or switches mechanically coupled to the sensor device, the heating element is energized at full power. When the temperature exceeds the threshold the heating element is de-energized. An electronic control system for an automatic surface unit in which the electromechanical sensing and control devices are replaced by a microprocessor based control arrangement is described in commonly assigned U.S. Pat. No. 4,493,980, which is hereby incorporated by reference.

A problem common to both the electromechanical and the electronic temperature sensing arrangements for automatic surface units is that a failure in the sensor circuitry typically results in either the surface unit being operated at full power continuously or the surface unit being totally de-energized. The user, being unaware of the failure, may be greatly inconvenienced by either overheating or underheating a dish. Furthermore, even if aware of the failure, the user is unable to make productive use of that surface unit until the sensor is repaired or replaced.

It would be desirable to provide an arrangement for automatically detecting the occurrence of a failure of the sensor, informing the user of the existence of the failure, and enabling the user to continue to use the surface unit as a non-automatic surface unit during the interim until the surface unit is repaired at the user's convenience.

It is therefore an object of the present invention to provide an improved control arrangement for a cooking appliance featuring an automatic surface unit which automatically detects the failure of the temperature sensor and provides a signal to the user indicative of the occurrence of such a failure.

It is a further object of the invention to provide a control arrangement of the aforementioned type which enables the user to continue to use the surface unit after the occurrence of a sensor failure as a non-automatic or regular surface unit.

SUMMARY OF THE INVENTION

The present invention provides an improved control arrangement for a cooking appliance of the type having at least one automatic surface unit equipped with a temperature sensor for sensing the temperature of a utensil being heated by the surface unit. In one form of the invention the control arrangement is particularly applicable to an appliance having a plurality of surface units at least one of which is an automatic surface unit and at least one of which is a regular surface unit. In such an appliance the user selects a heat setting for each of the surface units. The electronic control means is operative under normal operating conditions to control energization of each regular surface unit in accordance with an open loop control strategy as a function of the user selected heat setting, and to control energization of each automatic surface unit in accordance with a closed loop control strategy as a function of the user selected heat setting and the sensed utensil temperature. The control means is provided with a diagnostic means for detecting an abnormal operating condition of the automatic surface unit temperature sensor circuit, and is operative in response to the detection of an abnormal operating condition to change the control strategy for the automatic surface unit from the closed loop control strategy to the open loop control strategy. By this arrangement in the event of a temperature sensor circuit failure the automatic surface unit is available to the user for use as a regular surface unit.

In a preferred form of the invention the abnormal operating condition is detected by comparing the sensed utensil temperature to a first reference representing a temperature higher than the highest sensed temperature likely to occur during normal operation of the appliance and to a second reference representing a temperature lower than the lowest sensed temperature likely to occur during normal operation. An abnormal condition is signified upon detecting a sensed utensil temperature outside of the range established by the first and second references. To avoid erroneously identifying normal transient conditions or circuit failures, a timer aay be employed to monitor the duration of the time period for which the temperature is outside of the range. An abnormal condition is then signified only when the sensed utensil temperature is outside the range for more than a predetermined time period of sufficient duration to prevent the system from responding to normal transient conditions.

In accordance with a further aspect of the present invention the control arrangement includes means for providing a user discernible signal upon detection of the abnormal sensor operating condition to inform the user that the sensor failure has been detected and that the corresponding automatic surface unit is now operative as a regular surface unit. In accordance with this aspect of the invention a first user discernible signal is generated in the event the sensed utensil temperature is greater than the maximum reference temperature signifying an open circuit failure of the sensor circuit and a second signal is generated in response to detection of a sensed utensil temperature less than the lower referenced temperature signifying a short circuit failure of the sensor circuit. The information provided by these signals as to the nature of the failure of the sensor system may be useful to the service person seeking to correct the problem.

While the novel features of the invention are set forth with particularity in the appended claims, the invention, both as to organization and content, will be better understood and appreciated from the following detailed description taken in conjunction with the drawings.

BRIEF DESCRIPTION OF THE DRAWINGS

FIG. 8 is a flow diagram of the TEMP INPUT routine incorporated in the control program for the microprocessor in the circuit of FIG. 5;

DETAILED DESCRIPTION OF THE ILLUSTRATIVE EMBODIMENT

Figure 1:
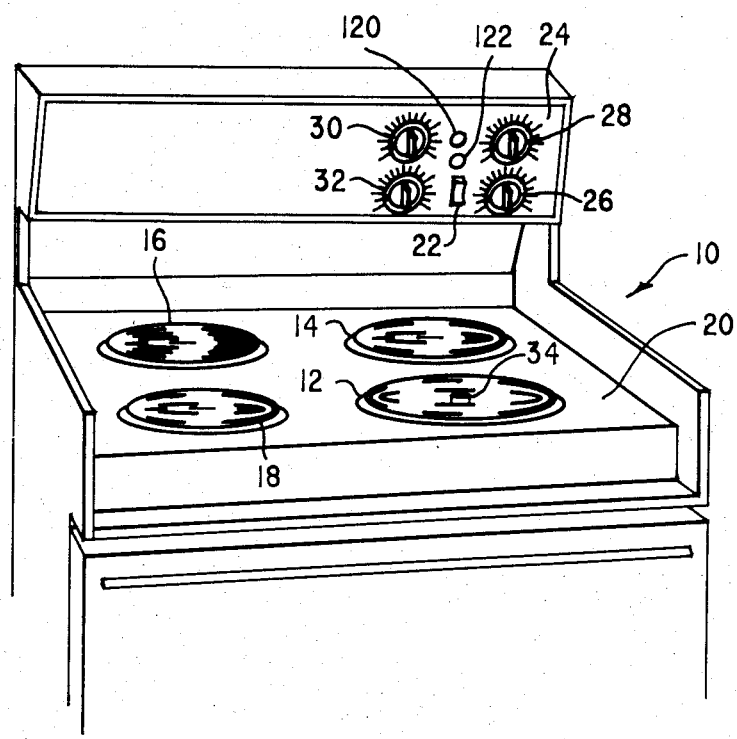
FIG. 1 is a front perspective view of a portion of an electric range illustratively embodying the sensor failure detection arrangement of the present invention.

FIG. 1 illustrates an electric range 10 incorporating a control arrangement illustratively embodying the present invention. Range 10 includes four conventional electric surface units comprising resistive heating elements 12, 14, 16 and 18 supported from a substantially horizontal support surface 20. Each of elements 12–18 are adapted to support cooking utensils, such as frying pans, sauce pans, tea kettles, etc., placed thereon for heating. Heating element 12 is arranged to function under normal operating conditions as an automatic surface unit, that is, energization of element 12 is automatically controlled in accordance with a closed loop power control strategy as a function of the sensed temperature of the utensil being heated thereon and the user selected heat setting. Heating elements 14, 16 and 18 are arranged to be duty cycle controlled in accordance with an open loop control strategy to provide a predetermined output power level corresponding to the user selected heat setting. While, as is common practice, the range of the illustrative embodiment is provided with only one automatic surface unit, it will be appreciated that multiple automatic surface units could be provided.

Figure 2A:
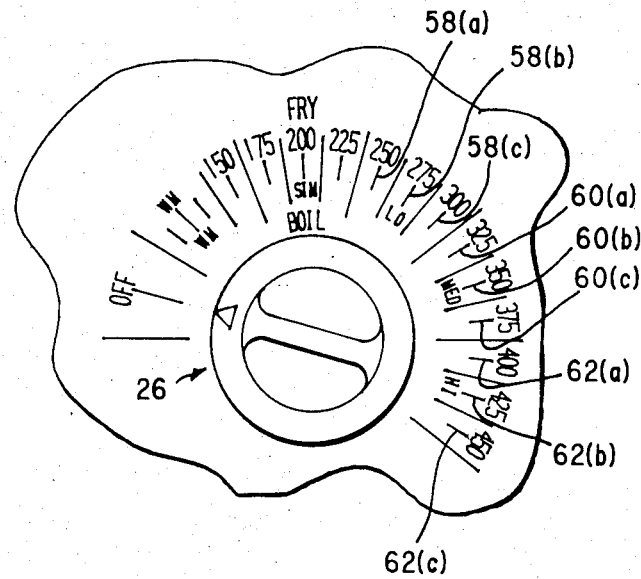
FIGS. 2A and 2B are greatly enlarged views of a portion of the control panel of the range of FIG. 1 showing the details of an automatic surface unit control knob and a regular surface unit control knob respectively.
Figure 2B:
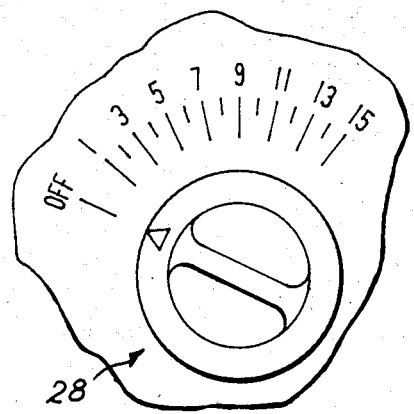

Mode selection switch 22 on control panel 24 enables the user to select the Fry Mode or the general Boil Mode for heating element 12. Manually operable rotary control knobs 26, 28, 30 and 32 are mounted to control panel 24. Control knobs 26 and 28 are illustrated in greater detail in FIGS. 2A and 2B respectively. Control knob 26 enables the user to select a plurality of heat settings corresponding to various cooking temperatures for the Fry Mode, and to select Warm, Simmer and Lo, Med and Hi Boil Modes for the general Boil mode. In the Boil mode the user may select from a plurality of heat settings within these modes as well. Knob 28 and knobs 30 and 32 which are identical to knob 28 enable the user to select the desired one of power levels 1–15 for heating elements 14, 16 and 18, respectively.

Figure 3A:
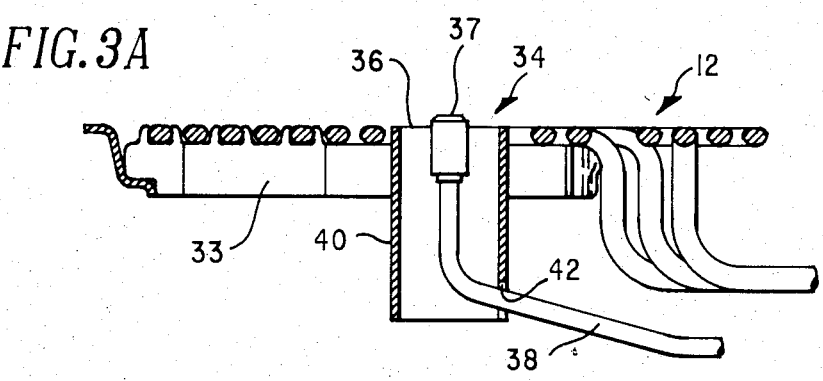
FIG. 3A is a sectional side view of a surface unit of the type incorporated in the range of FIG. 1 showing the temperature sensor.

The utensil temperature sensing arrangement employed with the automatic surface unit in the illustrative embodiment will now be described with reference to FIG. 3A. Surface unit heating element 12 is supported on spider arms 33. The temperature sensor apparatus designated generally 34 includes a housing 36 mounted on one end of an elongated, generally L-shaped tubular arm 38.

Figure 3B:
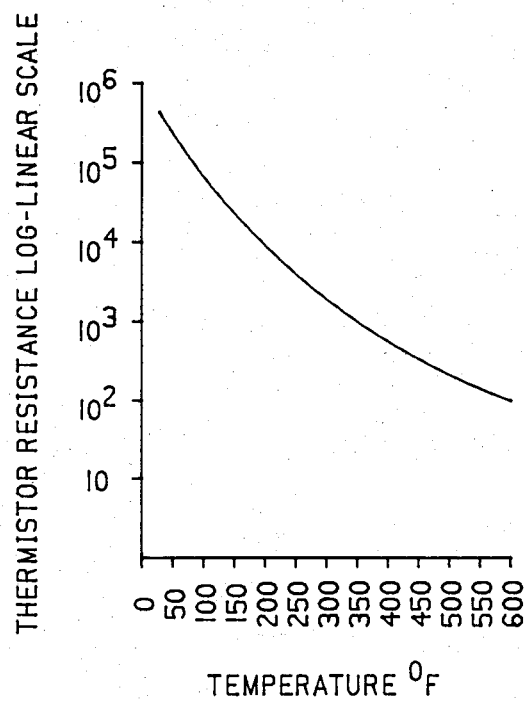
FIG. 3B is a graphic representation of the resistance versus temperature characteristic for the temperature sensor of FIG. 3A.

A cylindrical shield 40 of low thermal mass metal forms the central core to which the radial spider arms 33 are attached and also serves to shield sensor housing 36 from radiated heat from heating element 12. Arm 38 extends through a slot 42 in shield 40, and bears against the upper end of the slot to hold housing 36 in the proper position slighly above the element 12 so as to cause the uppermost surface 37 of housing 36 to resiliently contact the bottom of a cooking utensil when it is placed on heating element 12. The temperature sensitive element (not shown) of the sensor contained within housing 36 is a conventional negative temperature coefficient thermistor having a resistance vs. temperature characteristic as shown in FIG. 3B. The structural details of this sensor arrangement do not form any part of the subject invention and are thus described only to the extent necessary for an understanding of the present invention. Such devices are described in greater detail in commonly assigned U.S. Pat. No. 4,241,289, the disclosure of which is hereby incorporated by reference.

Figure 4:
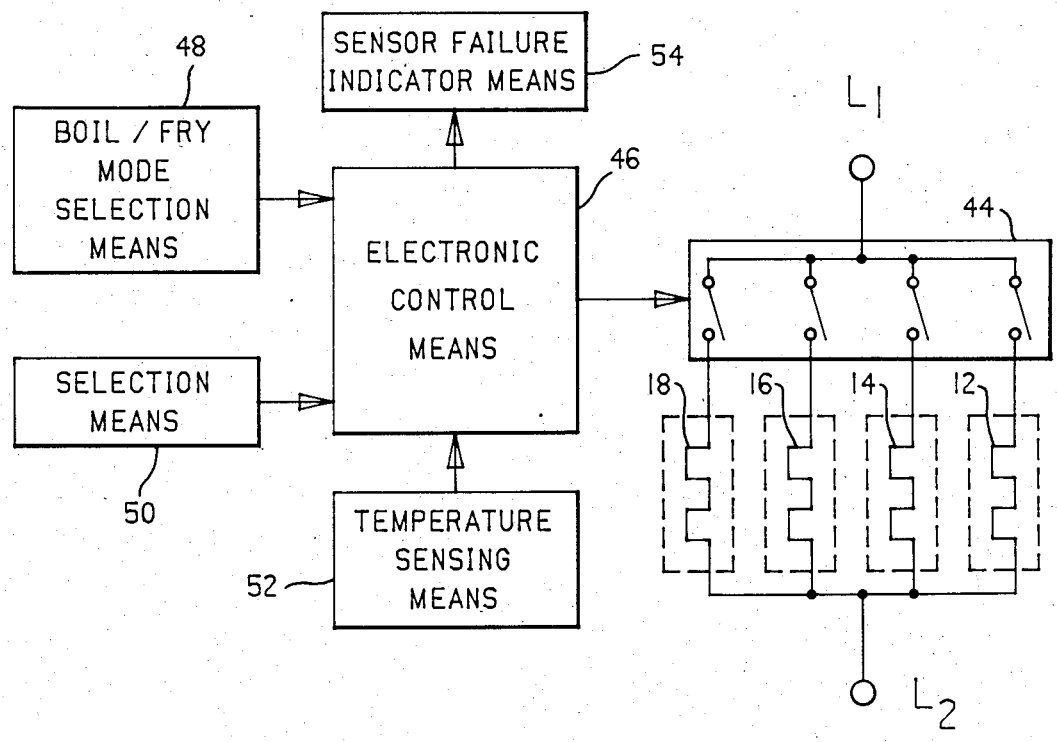
FIG. 4 is a greatly simplified functional block diagram of the control arrangement employed in the range of FIG. 1 embodying the sensor failure detection arrangement of the present invention.

A generalized functional block diagram of the control arrangement for heating elements 12–18 of range 10 is shown in FIG. 4. Heating elements 12–18 are energized by a standard 60 Hz AC power signal which can be either 120 or 240 volts supplied to terminals L1 and L2. Power to elements 12–18 is controlled by switch means 44 comprising a separate switching device for each of elements 12–18. The switching devices of switch means 44 are each switched into and out of conduction by control signals generated by electronic control means 46.

Electronic control means 46 generates power control signals for element 12 in response to inputs from the user operable input selection means comprising Boil/Fry mode selection means 48 and heat setting selection means 50, signifying mode and heat setting selections respectively and inputs from temperature sensing means 52 which senses the temperature of the utensil being heated by element 12. Power control signals for elements 14-18 are generated in response only to the heat setting selections via selection means 50.

In the illustrative embodiment, electronic control means 46 controls the output power level of each of heating elements 12-18 by controling the duty cycle, i.e., the percentage of time power is applied to each heating element. A predetermined control period comprising a fixed number of control intervals is employed as the time base for power control. The ratio of conductive control intervals to the total number of control intervals in the control period, expressed as a percentage, is hereinafter referred to as the duty cycle. Preferably each control interval comprises eight full cycles of the standard 60 Hz 240 volt AC power signal corresponding to a time period of approximately 133 milliseconds. Each control period comprises 32 control intervals corresponding to a time period of approximately 4 seconds. The duration for the control interval and control period selected provide a satisfactory range of heat settings for desired cooking performance and can be programmed to make efficient use of microprocessor memory. It is understood, however, that control intervals and control periods of greater and lesser duration could be similarly employed.

TABLE I

| Power Level | % On Time | On Control Intervals Per Control Period | Hex Rep M(KB) |
|---|---|---|---|
| OFF | 0 | 0 | 0 |
| 1 | 3.0 | 1 | 1 |
| 2 | 6.5 | 2 | 2 |
| 3 | 9 | 3 | 3 |
| 4 | 12.5 | 4 | 4 |
| 5 | 16 | 5 | 5 |
| 6 | 22 | 7 | 6 |
| 7 | 25 | 8 | 7 |
| 8 | 31.5 | 10 | 8 |
| 9 | 37.5 | 12 | 9 |
| 10 | 44 | 14 | A |
| 11 | 50 | 16 | B |
| 12 | 62.5 | 20 | C |
| 13 | 75 | 24 | D |
| 14 | 87.5 | 28 | E |
| 15 | 100 | 32 | F |

As used herein, open loop control strategy refers to controlling the output power of the surface unit simply as a function of the user selected heat setting, without utensil temperature sensor feedback. Closed loop control strategy refers to controlling the output power of the surface unit as a function of both user heat setting and sensed utensil temperature. Similarly, regular surface unit refers to a surface unit operated in accordance with an open loop control strategy; automatic surface unit refers to a surface unit operated in accordance with a closed loop strategy.

In accordance with either the closed loop or the open loop, control strategies electronic control means 46 selectively implements one of sixteen different duty cycle power levels, including a zero duty cycle or OFF level. Table I shows the percentage ON time, i.e. the duty cycle and the number of conductive control intervals per control period for each of sixteen available power levels.

In the illustrative embodiment each of heating elements 14-18 is operated as a regular surface unit. The user selects the desired power setting by manipulation of the corresponding one of control knobs 24-28. Control means 46 then switches the associated heating element into conduction for the number of control intervals during each control period to implement the duty cycle associated with the selected heat setting. The duty cycle for each of the heat settings is shown in Table I.

Element 12 is operated under normal operating conditions as an automatic surface unit. As hereinafter described, with reference to Table II, the particular closed loop strategy varies according to selection of the Fry or Boil modes.

The Fry and Boil modes will be described herein only to the extent necessary for an understanding of the present invention. A power control arrangement implementing such operating modes is described and claimed in commonly assigned U.S. Pat. No. 4,493,980 which is hereby incorporated by reference. The user selects the Fry or Boil Mode by manipulation of mode switch 32.

The Fry Mode is intended to rapidly bring the temperature of the utensil to the selected relatively narrow operating temperature range while avoiding extensive temperature overshoots and undershoots which can adversely affect cooking performance. Relatively tight control over the steady state operating temperature of the heating element is desired in the heating of a wide variety of food loads. The temperature range associated with each heat setting for the Fry Mode in the illustrative embodiment is shown in Table II.

To facilitate rapid thermal response to an increase in heat setting, either from OFF or from a previously selected heat setting, the heating element is operated at a transient power level determined by the electronic control means as a function of the difference between the steady state temperature range and the sensed utensil temperature when the sensed utensil temperature is less than the steady state temperature range for the selected heat setting. As this temperature difference approaches zero, the applied power level approaches the steady state level.

For steady state operation each Fry Mode heat setting has associated with it a steady state duty cycle or power level which is intended to maintain typically loaded cooking utensils within the corresponding steady state temperature range following the transient heat-up period. When the sensed utensil temperature exceeds the steady state temperature range the heating element is de-energized. If the sensed utensil temperature decreases below the steady state temperature range, the power level applied to the heating element is adjusted upwardly as a function of the temperature difference just as during the transient heat-up period.

The Fry Mode also enables the user to select a WARM level. Operation in the Warm Mode is hereinafter described with reference to the general Boil Mode.

TABLE II

| Hexadecimal Representation of Setting (KB) | Fry Mode | | | Boil Mode | | |
|---|---|---|---|---|---|---|
| | Selected Heat Setting | Steady State Utensil Temp. Range °F. | Steady State Power Level M(KB) | Selected Heat Setting | Steady State Utensil Temp. Range °F. | State Power Level M(KB) |
|---|---|---|---|---|---|---|
| 0 | OFF | — | 0 | OFF | — | 0 |
| 1 | Wm | 116–140 | 2 | Wm(1) | 116–140 | 2 |
| 2 | Wm | 116–140 | 3 | Wm(2) | 116–140 | 3 |
| 3 | 150 | 141–165 | 5 | Wm(3) | 141–165 | 4 |
| 4 | 175 | 166–190 | 6 | Sim(1) | 191–215 | 4 |
| 5 | 200 | 191–215 | 7 | Sim(2) | 191–215 | 5 |
| 6 | 225 | 216–240 | 8 | Sim(3) | 191–215 | 6 |
| 7 | 250 | 241–265 | 8 | Lo(1) | 216– | 8 |
| 8 | 275 | 266–290 | 9 | Lo(2) | 216– | 9 |
| 9 | 300 | 291–315 | A | Lo(3) | 216– | A |
| A | 325 | 316–340 | B | Med(1) | 216– | B |
| B | 350 | 341–365 | B | Med(2) | 216– | B |
| C | 375 | 366–390 | C | Med(3) | 216– | C |
| D | 400 | 391–415 | D | Hi(1) | 216– | D |
| E | 425 | 416–440 | D | Hi(2) | 216– | E |
| F | 450 | 441–465 | D | Hi(3) | 216– | E |

The General Boil Mode, when selected via mode switch 22, enables the user to select the Warm, Simmer and actual Boil Modes, the latter being further divided into Lo, Med and Hi Boil Modes. The temperature ranges and power levels for each heat setting for the generalized Boil Mode is presented in Table II.

The purpose of the Warm Mode is to enable the user to warm food quickly to a predetermined relatively low temperature substantially less than the boiling point of water. Three Warm settings, Wm(1), Wm(2), and Wm(3) are available in the Warm mode. The temperature limits and steady state duty cycles for these Warm heat settings are shown in Table II. In the Warm mode heating element 12 is operated at power level 6 corresponding to a 22% duty cycle when the sensed utensil temperature is less than the minimum threshold temperature of 116° F. In order to bring the utensil temperature rapidly to its desired temperature, it has been empirically determined that for heating element 12 this is the maximum duty cycle which can be applied without risk of scorching food in the utensil. If the sensed utensil temperature exceeds the temperature range for the selected setting, the heating element is de-energized until the sensed temperature cools to within the temperature range. Should the temperature fall below the desired range, power level 6 is implemented until the sensed temperature falls within the desired temperature range. The three heat settings in this mode provide some flexibility for the user in selecting the proper heat setting for the size of the food load being warmed.

The Simmer Mode enables the user to heat food rapidly to a temperature closely approaching but not exceeding the boiling point of water (212° F.) and then to hold the temperature of the food at this level without boiling when left unattended.

There are three heat settings for the Simmer Mode designated in Table II as Sim(1), Sim(2) and Sim(3). The steady state temperature range for all three settings is 198°–220° F. This range for the sensed utensil temperature assures that the contents of the utensil will be near the boiling point of water (212° F.) but will not be hot enough to actually boil. A more detailed description of the Simmer mode may be found in the hereinbefore referenced U.S. Pat. No. 4,493,980.

The three actual boil modes, that is the three modes for controlling the actual boiling of water loads contained in utensils placed on heating element 12, are designated Lo, Med, and Hi Modes. Each of these modes has three heat settings corresponding to selection marks 58(a)–(c), 60(a)–(c) and 62(a)–(c) for Lo, Med and Hi Boil Modes, respectively for control knob 26 (FIG. 2A); hence, in the illustrative embodiment the user can select from a total of 9 heat settings for boiling water loads on heating element 12.

These nine heat settings enable the user to select the steady state power level or duty cycle which will achieve the desired boiling rate for various size water loads without employing a power level substantially higher than necessary thereby enhancing the energy efficiency of the appliance.

As described in greater detail in the aforementioned U.S. Pat. No. 4,493,980, the Boil mode provides a rapid thermal response as well as efficient steady state operation by operating the heating element at full power until the sensed utensil temperature exceeds a predetermined reference temperature and thereafter operating the heating element at a steady state power level associated with the user selected heat setting.

It will be appreciated that the temperature sensor circuit for the automatic surface unit though generally highly reliable is vulnerable to open circuit and short circuit failures. An open circuit failure appears to the electronic controller as a very high resistance and a short circuit failure appears as a very low resistance. In accordance with the resistance versus temperature characteristic of the thermistor employed in sensor 34 shown in FIG. 3B, high resistance signifies low temperature and low resistance signifies high temperature. Consequently, absent the diagnostic and adaptive control arrangement of the present invention hereinafter described, the power control system would respond to an open circuit failure by energizing the surface unit at full power and to a short circuit failure by de-energizing the surface unit. Consequently, the surface unit would be rendered essentially useless to the user until the sensor failure is corrected.

The control arrangement of the present invention detects the occurrence of an abnormal operating condition of the sensor circuit in the form of either a short circuit or an open circuit failure and changes the power control strategy for the surface unit from the closed loop control strategy of the automatic surface unit to the open loop control strategy of the regular surface units. Applying this arrangement to the illustrative embodiment, should such a failure occur, automatic surface unit 12 is automatically converted to a regular surface unit operable in the same way as the three regular surface units 14-18. Thus, even though surface unit 12 will not function as an automatic surface unit until the sensor failure is corrected, it remains available to the user for use as an additional regular surface unit in the interim.

In the illustrative embodiment, to detect an abnormal operating condition of the temperature sensor, the utensil temperature is periodically sampled by the controller. The temperature samples are compared to a first reference representative of a temperature higher than the highest temperature measurement likely to be encountered in normal operation to test for a short circuit failure and to a second reference representative of a temperature lower than the lowest temperature likely to be encountered in normal operation to test for an open circuit failure. The highest selectable temperature is 450° F. in the Fry mode. The high reference represents a temperature somewhat arbitrarily set at approxiaately 500° F. It will be appreciated that this reference value should be sufficiently higher than the normally occurring maximum to avoid erroneous or nuisance failure detections. As additional protection against nuisance trips of the failure detection arrangement, a minimum time period for the duration of the high temperature condition is established which must be exceeded before the control responds to the high temperature condition as a short circuit failure.

The low reference represents a temperature also somewhat arbitrarily chosen to be approximately 90° F. Under steady state conditions for all automatic cooking modes the sensed utensil temperature should be above 90° F. However, under transient conditions as may exist for example when the unit is initially heating up from room temperature, lower readings will occur even when operating normally. To prevent erroneous response under such conditions, a minimum reference time period for the duration of a low temperature condition is set which must be exceeded before the control responds to the low temperature condition as an open circuit sensor circuit failure. The duration of this period must be such that under normal operation conditions for the lowest automatic heat setting, the sensed temperature will always exceed the low reference temperature before the reference time period expires. In the illustrative embodiment a time period of one minute is employed.

User discernible signal generating means are provided to alert the user to the occurrence of an abnormal operating condition in the sensor circuit, and that the unit is operating as a regular surface unit. In the illustrative embodiment, two signal lights are provided, one to signify the occurrence of a short circuit failure and the other to signify an open circuit failure. This diagnostic feature aids the service person in diagnosing and correcting the condition.

Circuit Description

Figure 5:
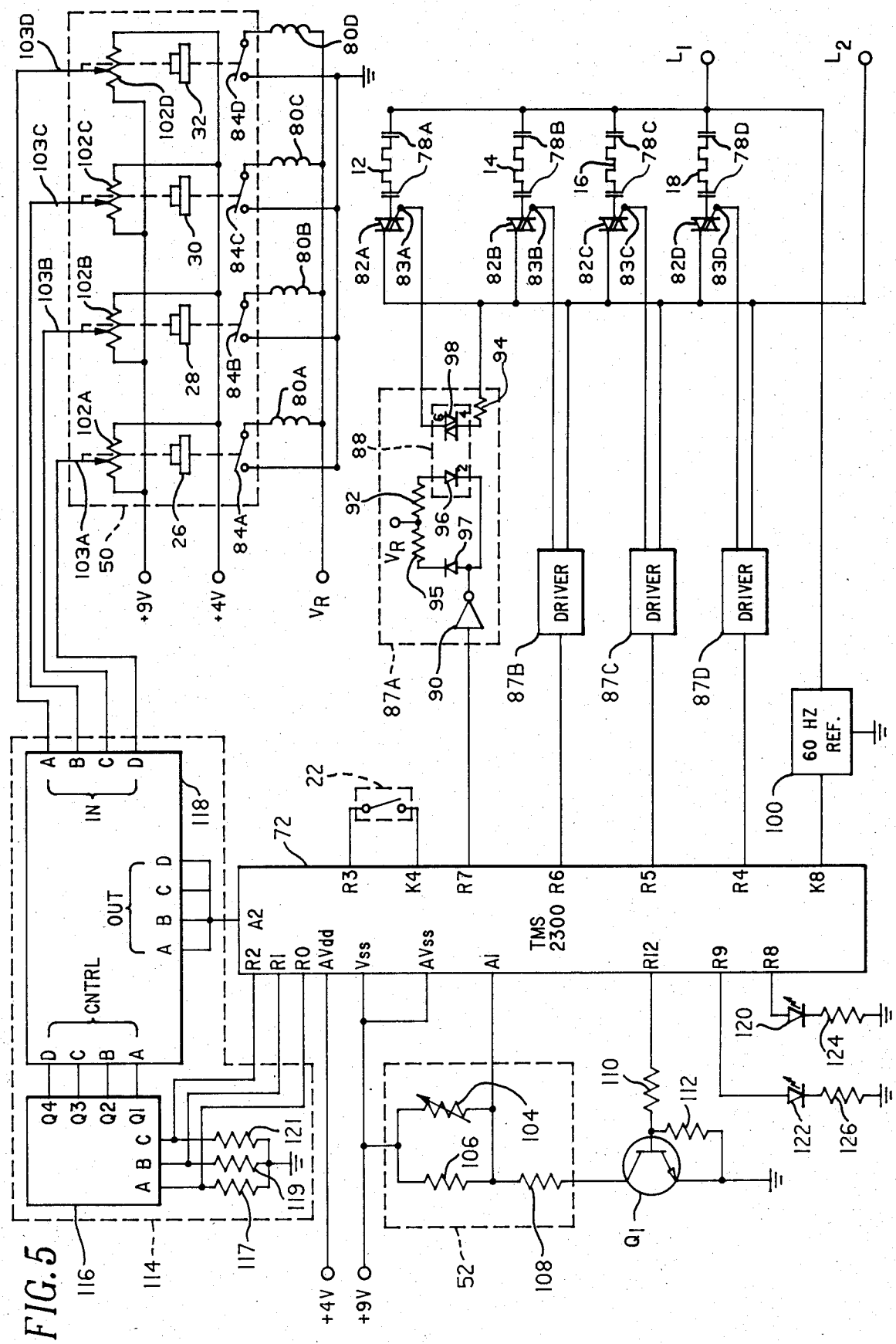
FIG. 5 is a simplified schematic diagram of a control circuit for the range of FIG. 1.

A control circuit illustratively implementing the hereinbefore described operating modes and illustratively embodying the sensor circuit diagnostic arrangement of the present invention is represented in simplified schematic form in FIG. 5. Power to energize heating elements 12-18 is provided by application of a standard 60 Hz AC power signal of either 120 or 240 volts across terminals L1 and L2. Heating ements 12-18 are arranged in electrical parallel fashion across lines L1 and L2 via normally open relay contacts 78A-78D controlled by relay coils 80A-80D and power control triacs 82A-82D respectively. Each of on-off relay coils 80A-80D is serially connected between DC reference voltage supply of $V_R$ and system ground via switch contacts 84A-84D respectively. Each of switch contacts 84A-84D is mechanically coupled in conventional manner (illustrated schematically) to control knobs 26-32 respectively such that each of switch contacts 84A-84D is in its open position when its associated control knob is in its off position. Movement of its associated control knob from its off position places the switch in its closed position, energizing the associated one of coils 80A-80D which in turn closes associated contacts 78A-78D respectively thereby enabling the corresponding one of power control triacs 82A-82D to control energization of the corresponding heating element.

Microprocessor 72 controls the switching of power control triacs 82A-82D by trigger signals provided at output ports R7, R6, R5 and R4 respectively. The signals at output ports R7, R6, R5 and R4 are coupled to the gate terminal of the associated triacs via driver circuits 87A-87D respectively. Referring to circuit 87A, which is shown in greater detail, the trigger signal at R7 is coupled to pin 2 of opto-isolator device 88 by inverting buffer amplifier 90. Pin 1 of opto-isolator 88 is coupled to DC reference voltage supply via current limiting resistor 92. The output return pin 4 of opto-isolator 88 is coupled to power line L2 via current limiting resistor 94. Pin 6 is coupled to the gate terminal 83A of power control triac 82A which is connected in series with heating element 12. The trigger signal at R7 is inverted by amplifier 90 forward biasing light emitting diode 96 of opto-isolator 88 which in turn switches the bi-polar switch portion 98 of opto-isolator 88 into conduction to apply a gate signal to power control triac 82A switching it into conduction. The output of amplifier 90 is also coupled to the DC reference voltage supply $V_R$ via current limiting resistor 95 and diode 97. Driver circuits 87B-87D are similarly configured.

A 60 Hz pulse train is generated by conventional zero crossing detector circuit 100 coupled between L1 and input port K8 of microprocessor 72 to facilitate synchronization of triac triggering and other control system operations with zero crossings of the 60 Hz AC power signal applied across L1 and L2.

Sensed utensil temperature inputs are provided to microprocessor 72 via temperature sensing means 52 comprising a thermistor device 104 connected in parallel with linearizing precision resistor 106 and in series with precision resistor 108 forming a voltage divider network energized by a regulated +9 volt dc voltage supply. The divider network is coupled to ground through transistor Q1. The junction of thermistor 104 and resistor 108 is coupled to microprocessor input port A1. The analog voltage at this point is proportional to the temperature sensed by the thermistor. Microprocessor 72 has an internal 8-bit A/D converter which operates between voltage rails AVSS and AVDD which are set at 9 volts DC and 4 volts DC respectively, to provide a 5 volt voltage swing. The internal A/D converter measures the input voltage signal at A1 and converts this signal to a corresponding digital value. Table III lists representative values of the thermistor resistance, and corresponding temperature and analog voltage values. Also shown in Table III is the Hexadecimal representation of the corresponding 8 bit binary code resulting from the A/D conversion of the analog voltage values.

Transistor Q together with biasing resistors 110 and 112 functions as a disabling circuit. Output port R12 of microprocessor 72 is coupled to the base of Q1 via resistor 110. Resistor 112 is connected between the emitter and the base of transistor Q1. The function of the disabling circuit is to only allow current flow through thermistor 104 when temperature measurements are being made. To this end, when a temperature measurement is to be made microprocessor 72 sets output R12 causing a positive voltage to be applied to the base of Q1 via resistor 110 switching Q1 into conduction. After the temperature input is obtained, R12 is reset rendering Q1 and thermistor 104 non-conductive.

TABLE III

| Temperature °F. | Resistance (Ω) | Analog Volts | Hex Rep | Dec Rep |
|---|---|---|---|---|
| 115 | 22,000 | 4.71 | 24 | 36 |
| 140 | 11,500 | 4.86 | 2C | 44 |
| 165 | 7,600 | 5.04 | 35 | 53 |
| 190 | 5,000 | 5.33 | 44 | 68 |
| 215 | 3,300 | 5.63 | 53 | 83 |
| 240 | 2,100 | 6.02 | 67 | 103 |
| 265 | 1,500 | 6.41 | 7B | 123 |
| 290 | 1,050 | 6.82 | 90 | 144 |
| 315 | 740 | 7.16 | A1 | 161 |
| 340 | 560 | 7.47 | B1 | 177 |
| 365 | 410 | 7.77 | C0 | 192 |
| 390 | 320 | 7.96 | CA | 202 |
| 415 | 250 | 8.14 | D3 | 211 |
| 440 | 200 | 8.27 | DA | 218 |
| 465 | 150 | 8.45 | E3 | 227 |

User inputs are provided to microprocessor 72 via Boil/Fry Mode selection switch means 22 and heat setting selection means 50 comprising input potentiometers 102(A)-(D) associated with heating elements 12-18 respectively. Mode selection switch 22 is directly coupled between output port R3 and input port K4 of microprocessor 72. The open and closed states of switch 22 signify selection of the general Boil Mode and Fry Mode, respectively. Microprocessor 72 determines the state of switch 22 by periodically generating a logical high signal at R3 and monitoring the input signal at K4.

Each of input potentiometers 102(A)-(D) is coupled between a regulated 9 volt dc and a regulated 4 volt dc reference voltage supply. Each of wiper arms 103(A)-(D) of potentiometers 102(A)-(D) respectively is coupled to A/D input port A2 of microprocessor 72 via multiplexing circuit 114. Each wiper arm is positioned by user rotation of the associated one of control knobs 26-32. The voltage between the wiper arm and the 4 volt supply is an analog signal representing the selected heat setting. The internal A/D converter of microprocessor 72 described briefly above for processing the temperature inputs processes analog voltages appearing at A2 representing the user input settings in multiplex fashion.

Multiplexing circuit 114 comprises a conventional decoding circuit 116 configured to function as a 3 line to 4 line decoder and a gating circuit 118 which gates the appropriate wiper arm voltage signal to microprocessor input port A2. Multiplexing is controlled by scanning signals generated at output ports R0, R1, and R2, which are coupled to input ports A, B, and C of decoder 116. Biasing resistors 117, 119, and 121 are connected between R0, R1, and R2 respectively and ground. Decoder outputs Q1-Q4 are coupled to the control ports A-D of gating circuit 118. Input ports A-D of gating circuit 118 are connected directly to wiper arms 103(D)-(A) respectively. Output ports A-D of gating circuit 118 are commonly connected to input port A2 of microprocessor 72. The scan signals at R0, R1 and R2 sequentially generate enabling signals at outputs Q1-Q4. These enabling signals are coupled to the control inputs of gating circuit 118 to sequentially couple the analog wiper arm voltage signals from input ports A-D to A2 of microprocessor 72.

The processing of the resultant digitized temperature and power setting input signals will be described in conjunction with the following description of the control program.

User discernible signal generating means is provided in the form of light emitting diodes (LEDs) 120 and 122 coupled between output ports R8 and R9 respectively and ground via current limiting resistors 124 and 126 respectively. LED 120 is energized by a signal at R8 in response to detection of a short circuit failure. LED 122 is similarly enerized by a signal at R9 in response to detection of an open circuit failure.

The following component values are suitable for use in the circuit of FIG. 5. These values are illustrative only, and are not intended to limit the scope of the claimed invention.

| Fixed Resistors (Ω) | | | | Transistor Q1 | |
|---|---|---|---|---|---|
| 92 | 1K | 124 | 10K | 2N2222 | |
| 94 | 220 | 126 | 10K | Integrated Circuits | |
| 95 | 270 | | | 88 | MDC 3020 Integrated Circuit |
| 106 | 2.21K | 1% precision | | 90 | ULN 2004A Integrated Circuit |
| 108 | 2.21K | 1% precision | | 116 | CD4028BC Integrated Circuit |
| 110 | 22K | | | 118 | CD4026BC Integrated Circuit |
| 112 | 27K | | | Microprocessor | |
| 117 | 10K | | | 72 | Texas Instruments TMS 2300 |
| 119 | 10K | | | Triac | |
| Potentiometers (Ω) | | | | 82 | General Electric SC 147 |
| 102A-D | 10K | | | Surface Units | |
| Thermistor (Ω) | | | | 12-18 | General Electric |
| 104 | 50K | | | | WB 30 × 218 |

Control Program Description

Microprocessor 72 is customized to perform control functions in accordance with this invention by permanently configuring the Read Only Memory (ROM) of microprocessor 72 to implement predetermined control instructions. FIGS. 6 through 17 are flow diagrams which illustrate the control routines incorporated in the control program of microprocessor 72 to perform the control functions in accordance with the present invention. From these diagrams one of ordinary skill in the programming art can prepare a set of control instructions for permanent storage in the ROM of microprocessor 72. For the sake of simplicity and brevity, the control routines to follow will be described with respect to the implementation of the control algorithms of the present invention. It should be understood that in addition to the control functions of the present control arrangement herein described there may be other control functions to be performed in conjunction with other operating characteristics of the appliance. Instructions for carrying out the routines described in the diagrams may be interleaved with instructions and routines for other control functions which are not part of the present invention.

The control program consists of a sequence of routines which act on information stored in the Random Access Memory (RAM) of microprocessor 72. The RAM is arranged in four files, with one file associated with each surface unit. A register designated the X register is used to address the desired one of the four files. The control program is executed once during each control interval for each surface unit sequentially executing the control program on successive RAM files.

Control routines for implementing the Fry and Boil modes are described as illustrative examples of closed loop control strategies for automatic surface unit control.

Figure 6:
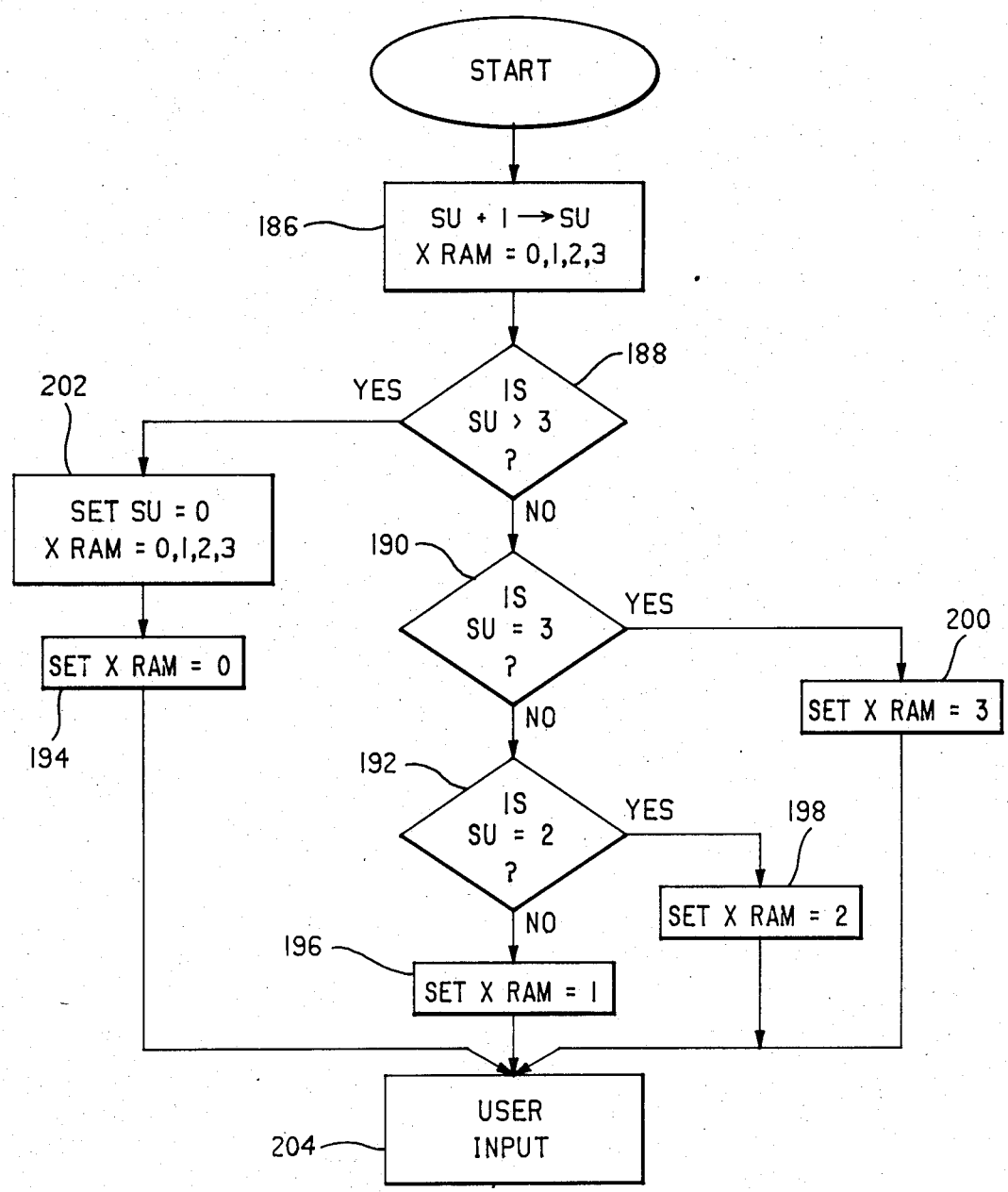
FIG. 6 is a flow diagram of the START routine incorporated in the control program for the microprocessor in the circuit of FIG. 5.

START Routine—FIG. 6

This routine is entered at the beginning of each control interval. The function is to call up the appropriate RAM file for the current pass through the control program. A counter is provided in each RAM file designated the SU counter. Each SU counter functions as a four count ring counter and used to call up the RAM files sequentially such that each RAM file is called up every fourth pass through the Control Program.

Referring now to FIG. 6, Block 186 increments the SU counters in all four files, X=0, 1, 2, 3. Inquiries 188, 190 and 192 determine the SU count and call up the appropriate one of RAM files 0, 1, 2 and 3 via Blocks 194, 196, 198 and 200 for SU equal to 1, 2, 3 and 4, respectively. Block 202 resets all of the SU counters to zero when SU equals 4.

Figure 7:
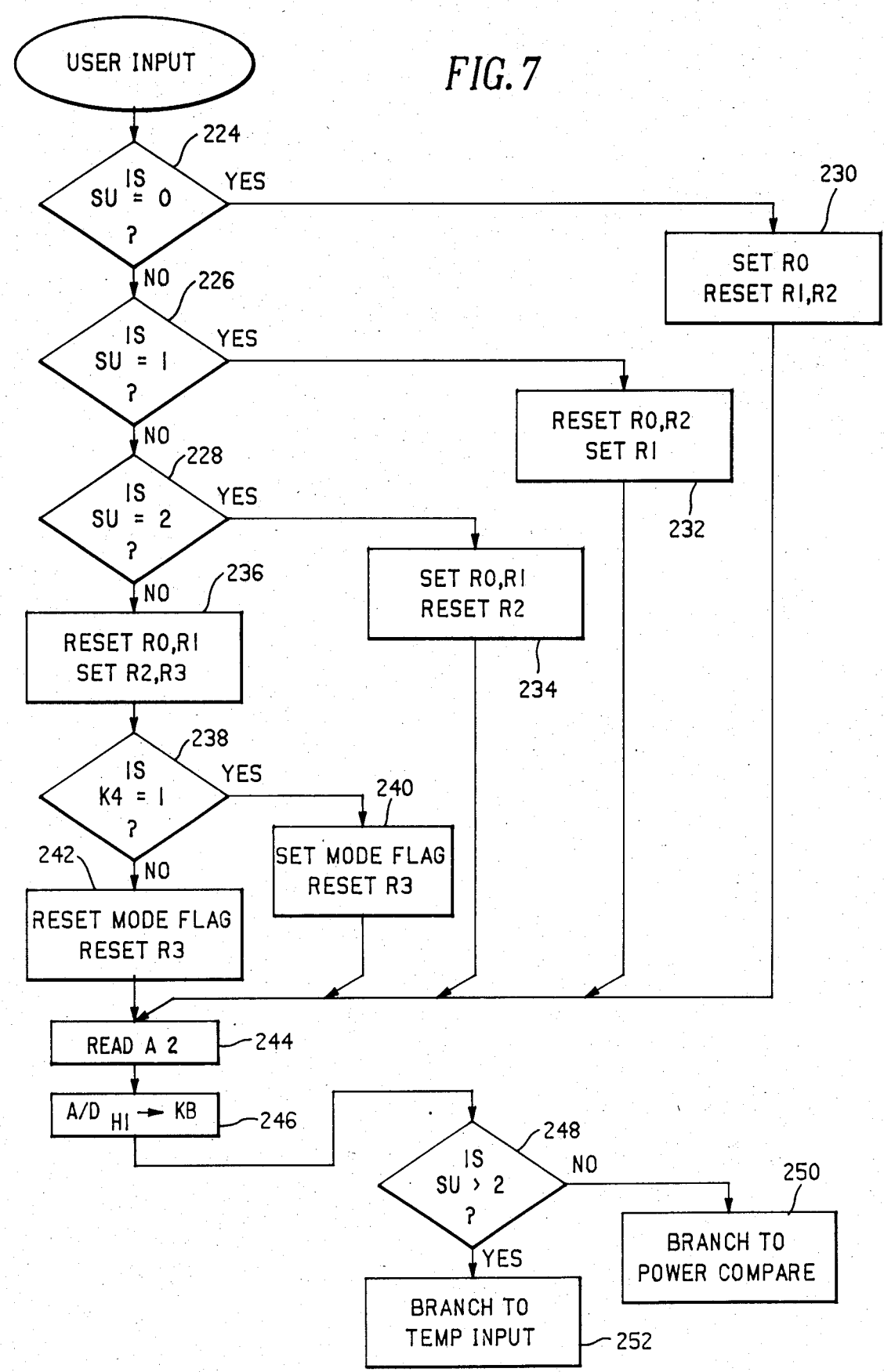
FIG. 7 is a flow diagram of the USER INPUT routine incorporated in the control program for the microprocessor in the circuit of FIG. 5.

After the appropriate RAM file is selected, the program branches (Block 204) to the User Input routine of FIG. 7.

USER INPUT Routine—FIG. 7

The function of this routine is to control the multiplexing of the user selected heat setting input signals at input port A2 via multiplexing circuit 114 (FIG. 5), and to determine whether Boil or Fry has been selected for the automatic surface unit.

It will be recalled that the control program is executed once during each control interval for each surface unit sequentially. Inquiries 224-228 determine for which surface unit the control program is being executed, that is, which surface unit is the subject of the present pass through the program. The three regular surface units 14-18 are designated SU2, SU1, and SU0 respectively; SU3 represents automatic surface unit 12. Blocks 230-236 generate the appropriate binary codes 100, 010, 110, and 001 for SU0-SU3, respectively at output ports R0, R1, and R2 to gate the appropriate one of wiper arms 103A-103D through gating circuit 118 to input port A2.

If SU=3, signifying that the program is being executed for the automatic surface unit, the state of mode select switch 22 is determined by setting output R3 (Block 236). Inquiry 238 then scans input port K4 to determine whether switch 32 is open (K4=0) or closed (K4=1). If K4=1, signifying selection of the Fry Mode, a Mode Flag is set for future reference in a subsequent routine and R3 is reset (Block 240). If K4=0, signifying selection of the Boil Mode, the Mode Flag is reset and R3 is reset (Block 242).

Having enabled the appropriate input at input port A2, voltage from the enabled one of potentiometers 102A-102D is converted to a digital signal. It will be recalled that there are 16 possible heat settings, each represented by a corresponding digital signal. The internal A/D conversion routine provided in microprocessor 72 will convert the analog voltage at pin A2 to an eight bit digital code capable of establishing 256 levels. Sixteen wiper arm positions corresponding to 16 heat settings are evenly spaced along the potentiometer. By this arrangement the user selected input setting may conveniently be represented by the four high order bits of the 8 bit A/D output signal. The analog input at port A2 is read in (Block 244) and converted to its corresponding digital signal. The four high order bits of this signal designated A/D HI are stored as the input power setting variable KB (Block 246).

Inquiry 248 determines if the present pass through the control is for the automatic surface unit SU3 (SU>2). If not, the program branches (Block 250) directly to the Power Compare routine of FIGS. 16A, B to implement the open loop power control strategy. If the program is being executed for the automatic surface unit, the program branches (Block 252) to the Temp Input routine (FIG. 8) to read in the sensed utensil temperature. Consequently, the routines associated solely with the automatic surface unit, namely the Temp Input, Filter and Sensor Timing, Boil, Fry, Warm, Open Check, Short Check and KB-XFER routines are only entered when the control program is operating on the RAM file associated with the automatic surface unit. When the control program is operating on the RAM files for the regular surface units 14-18, the program branches from the User Input routine to the Power Compare routine.

TEMP INPUT Routine—FIG. 8

The function of this routine is to convert the analog voltage at port A1 representing the sensed utensil temperature to a digital signal representative of the sensed utensil temperature. More specifically, this routine determines within which of 16 predetermined temperature ranges the present sensed utensil temperature falls. A hexadecimal value is assigned to the variable SENINP (and also SENOUT) corresponding to each of the 16 temperature ranges, as shown in Table IV. The hexadecimal value for the upper temperature threshold value for each temperature range is also included in Table IV.

TABLE IV

| Hex Rep SENINP & SENOUT | Temp. Range °F. | Hex Code Upper Threshold |
|---|---|---|
| 0 | T ≦ 115 | 24 |
| 1 | 115 < T ≦ 140 | 2C |
| 2 | 140 < T ≦ 165 | 35 |
| 3 | 165 < T ≦ 190 | 44 |
| 4 | 190 < T ≦ 215 | 53 |
| 5 | 215 < T ≦ 240 | 67 |
| 6 | 240 < T ≦ 265 | 7B |
| 7 | 265 < T ≦ 290 | 90 |
| 8 | 290 < T ≦ 315 | A1 |
| 9 | 315 < T ≦ 340 | B1 |
| A | 340 < T ≦ 365 | C0 |
| B | 365 < T ≦ 390 | CA |
| C | 390 < T ≦ 415 | D3 |
| D | 415 < T ≦ 440 | DA |
| E | 440 < T ≦ 465 | E3 |
| F | 465 < T | |

Referring now to FIG. 8, R12 is set (Block 270) to turn on transistor Q1 (FIG. 5) thereby enabling energization of thermistor 104. Next the analog voltage representing the sensed temperature is read in and converted to its 8 bit digital representation (Block 272). The variable TC in the flow diagram represents the digital value of the analog signal. Inquiries 274-302 determine the temperature range in which the sensed temperature falls and Blocks 304-334 assign the appropriate value to the temperature variable SENINP in accordance with Table V. After establishing the appropriate value for SENINP, R12 is reset (Block 336) to turn off Q1, de-energizing thermistor 104, and the program branches (Block 338) to the Sensor Filter and Timing routine (FIG. 9).

For example, if the sensed temperature is 200° F., the hexadecimal representation of the digital temperature signal will be greater than 44 corresponding to 190° F. and less than 53 corresponding to 215° F. Hence, the answer to Inquires 274-280 will be Yes. The response to Inquiry 282 will be No. The value 4 will be assigned to SENINP (Block 312). Having assigned a value to SENINP, R12 is reset (Block 336) and the program branches (Block 338) to the Sensor Filter and Timing routine (FIG. 9).

Figure 9:
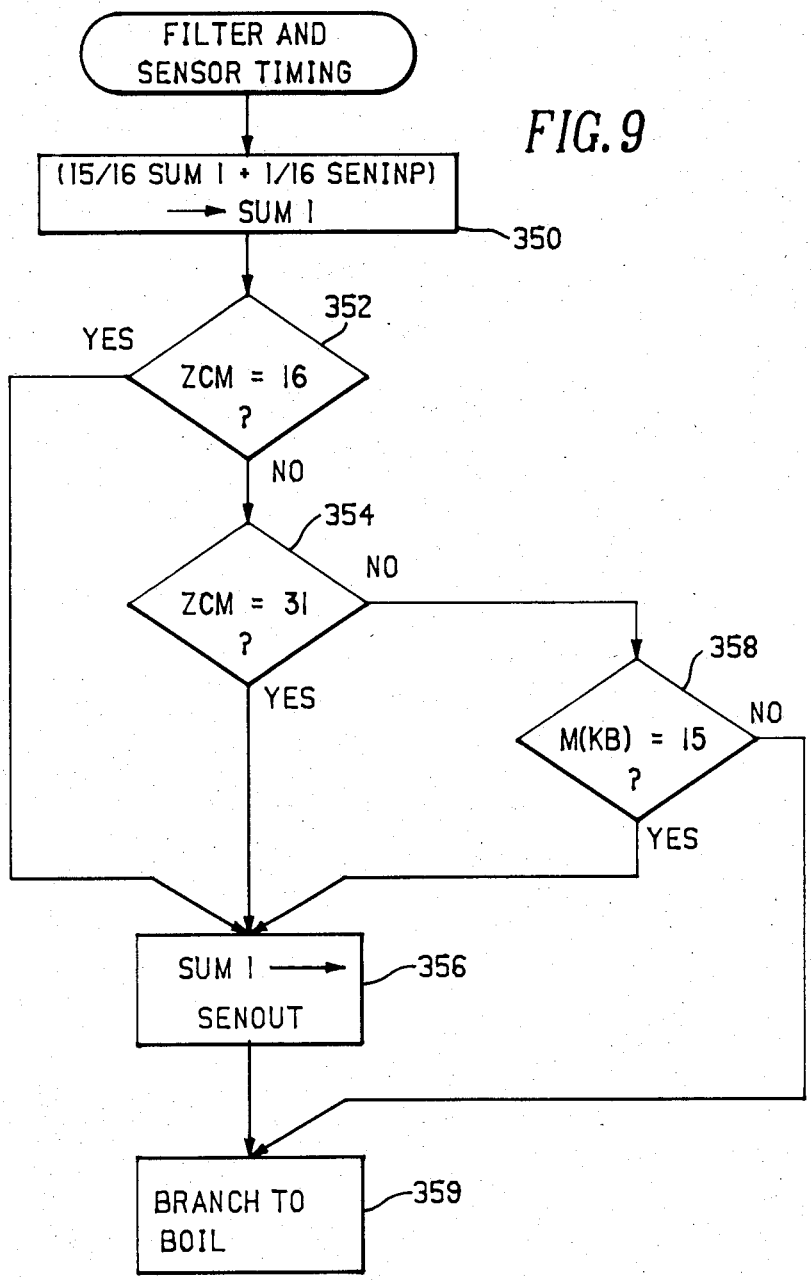
FIG. 9 is a flow diagram of the SENSOR FILTER and TIMING routine incorporated in the control program for the microprocessor in the circuit of FIG. 5.

SENSOR FILTER and TIMING Routine—FIG. 9

This routine performs the dual function of iteratively filtering the sensor output temperature signal SENINP and also controlling the timing of the updating of the temperature signal which is actually used in the control routines yet to be described. The filter function is implemented to minimize the impact of aberrant temperature measurement inputs from the temperature monitoring circuit; the timing function is implemented to minimize the effect of radiant energy from the heating element 12 impinging on thermistor 104 on the accuracy of the temperature measurements.

The iterative filter portion of this routine attaches relatively little weight to each individual input. Hence, isolated erroneous inputs are averaged out so as to have little effect on the accuracy of the cumulative average signal provided by the filter routine. Referring to FIG. 9, the filter function is performed by Block 350. It will be recalled that SENINP is the hexadecimal representation of the temperature range for the sensed utensil temperature determined in the hereinbefore described TEMP INPUT routine. One-sixteenth of the new SENINP input is added to 15/16 of the filter output variable designated SUM1 from the previous pass through this routine. The resultant sum becomes the new value for the filter output variable SUM 1.

A new temperature input signal SENINP is processed by the filter portion of this routine to generate a new SUM 1, during each pass through the control routine, i.e. once every 133 milliseconds corresponding to 8 cycles of the 60 Hz power signal. However, to minimize the effects of radiant energy for heating element 12 on sensor 50, the sensed utensil temperature signal which is input to the power control portion of the control program is only updated during selected portions of the 4.4 second duty cycle control period.

A counter designated the ZCM counter operates as a 32 count ring counter, counting from 0-31 and resetting to 0. In the duty cycle control implemented in the POWER OUT routine hereinafter described, for duty cycles less than 100% the heating element is energized during the first part of the control period when the ZCM count is relatively low and de-energized while the ZCM count is relatively high. Since, except when operating at the 100% power level, the heating element is always de-energized for count 31, radiant energy effects on the sensor are minimum at ZCM count 31. Thus, radiation effects are minimized by updating SENOUT, the temperature signal utilized in implementation of the Power Control routine only at count 31. It is desirable, however, to have at least two updates of SENOUT during each 4.4 second control period, to limit oscillations between inputs. Hence, SENOUT is also updated at the midpoint of the control period, i.e. at count 16. There is potentially more error due to radiation effects for this measurement; however, the heating element is de-energized at this point for the twelve lower power levels. Hence, the effects of radiation even on this measurement are minimum except at the highest 4 power levels.

When the heating element is operated at 100% duty cycle, the radiation effects are the same at all counts; hence, for maximum accuraqy SENOUT is updated during each execution of the control program, i.e. every 133 milliseconds.

Referring again to the flow diagram of FIG. 9, Inquires 352 and 354 look for ZCM counts of 16 and 31, respectively. Upon the occurrence of either count, SENOUT is updated by the then current value of SUM 1 (Block 356). Otherwise, Inquiry 358 checks to determine if the power level presenty being implemented is the 100% power level (M(KB)=15). If it is, SENOUT is updated by SUM 1 (Block 356) regardless of the count; if not, Block 233 is bypassed, and SENOUT is not updated during this pass. In this fashion for power levels lower than 15, SENOUT is updated only on counts 16 and 31, and when power level 15 is being implemented SENOUT is updated every count. Upon completion of this routine the program branches (Block 358) to the Boil routine (FIG. 10).

Figure 10:
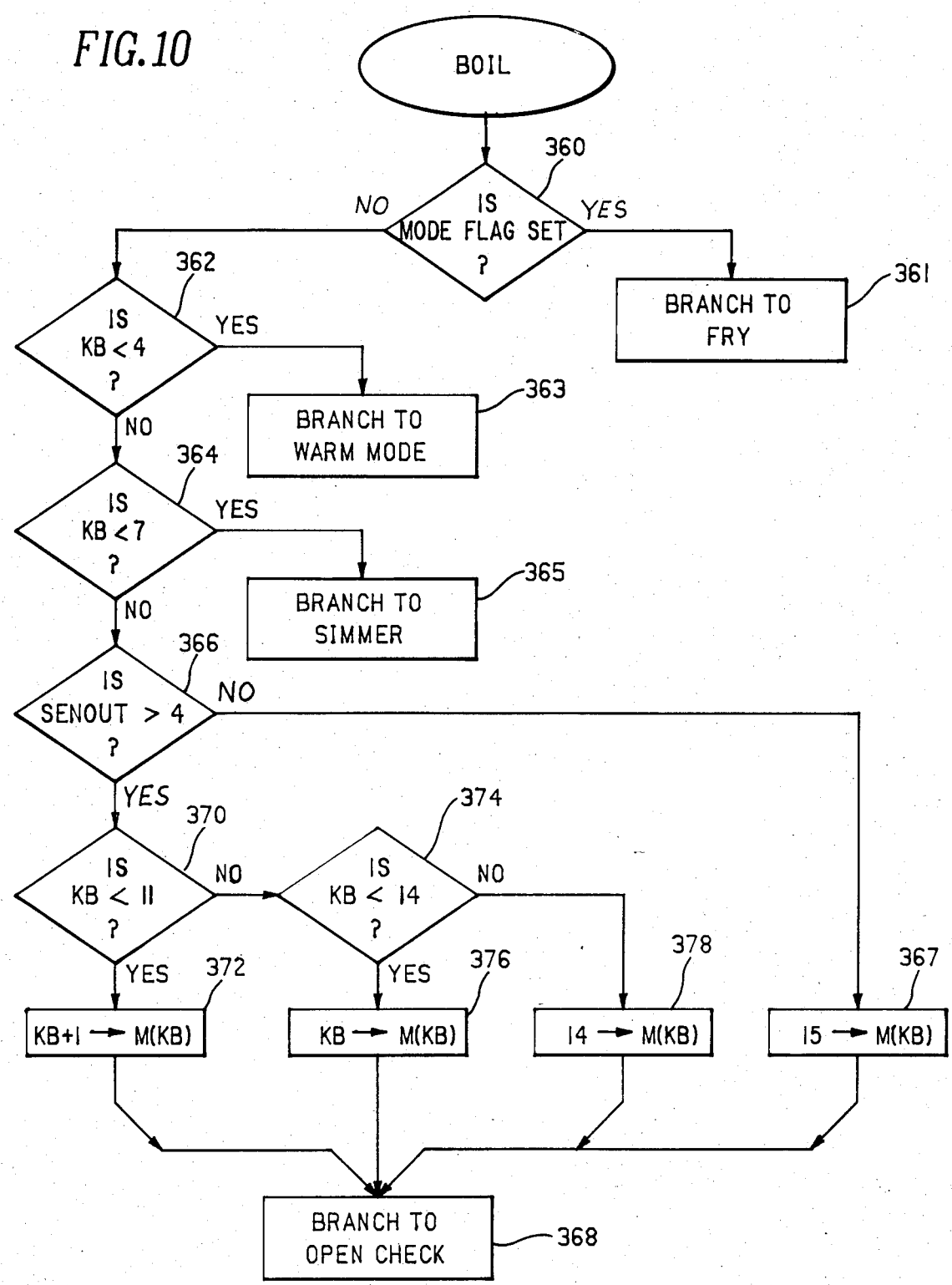
FIG. 10 is a flow diagram of the BOIL routine incorporated in the control program of the microprocessor in the circuit of FIG. 5.

BOIL Routine—FIG. 10

The function of this routine is to implement the actual Boil Modes. In the actual Boil Modes, the water loads are brought to a boil with the boil rate being determined by the heat setting selected by the user. It will be recalled that in the actual Boil Mode the surface unit is energized at a power level fifteen (100% duty cycle) until the sensed utensil temperature exceeds 215° F. When the sensed utensil temperature is greater than 215° F., the surface unit is energized at the steady state power level associated with the selected heat setting. The associated steady state power levels for settings 7-10 are 8-11, respectively. For heat settings 11-13 the associated steady state power levels are 11-13 respectively. For both heat settings 14 and 15 the associated steady state power level is 14 (Table II).

Variables KB, M(KB) and SENOUT are used in this routine. The variable KB represents the heat setting selected by the user by manipulation of control knob 22 (FIG. 2). Its value is assigned in the User Input routine. M(KB) is a variable which represents the power level at which the heating element is to be operated. When operating in the Boil Mode, its value is established in the Boil routine for use in the Power Compare routine to make the triac triggering decisions. SENOUT is the temperature variable representing the sensed utensil temperature, which is assigned a value in the Filter and Sensor Timing routine.

Figure 11:
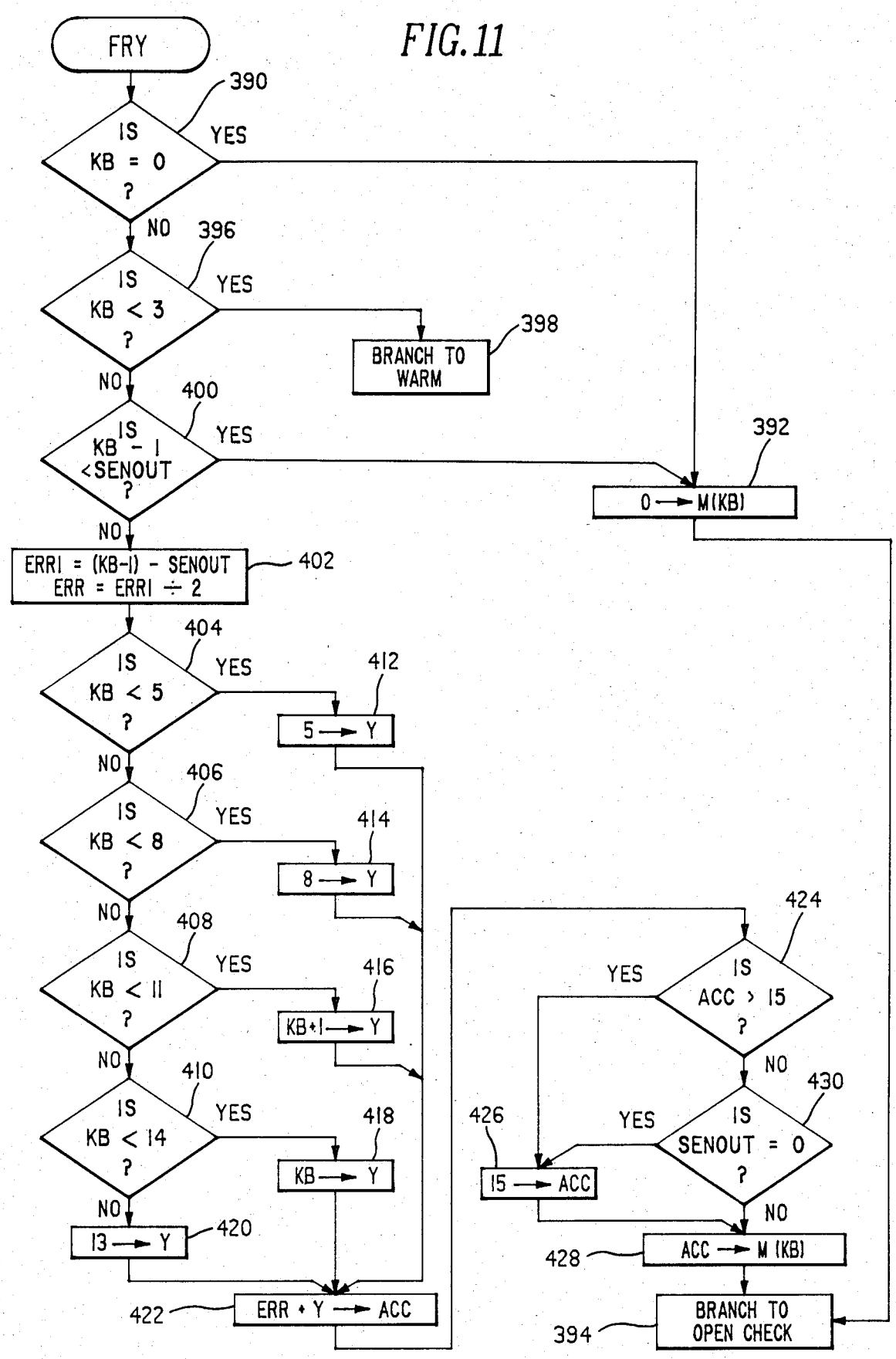
FIG. 11 is a flow diagram of the FRY routine incorporated in the control program for the microprocessor in the circuit of FIG. 5.
Figure 12:
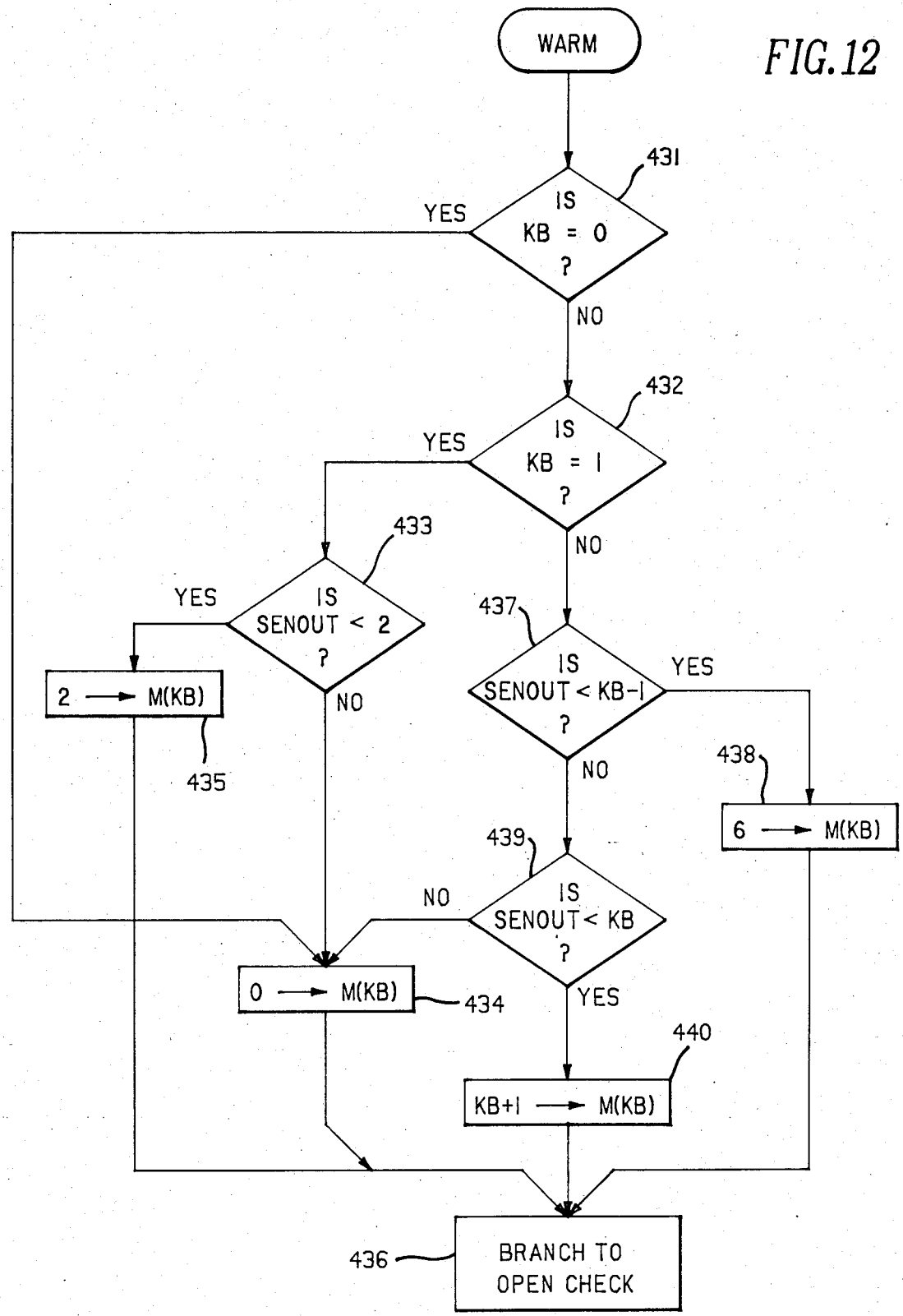
FIG. 12 is a flow diagram of the WARM routine incorporated in the control program for the microprocessor in the circuit of FIG. 5.

Referring now to the flow diagram of FIG. 10, Inquiry 360 determines if the Mode Flag is set signifying selection of the Fry Mode. If yes, the program branches (Block 361) to the Fry routine (FIG. 11). If the Boil Mode Flag is not set, Inquiry 362 determines if KB is less than 4. If so, the program branches (Block 363) to the Warm mode (FIG. 12). If KB is not less than 4, Inquiry 364 determines if KB is less than 7. If so, the program branches (Block 365) to the Simmer mode. In the interest of brevity, a description of the control algorithm for the Simmer mode is not described herein. However, a flow diagram for a suitable Simmer routine is described in the hereinbefore incorporated U.S. Pat. No. 4,493,980.

Figure 13:
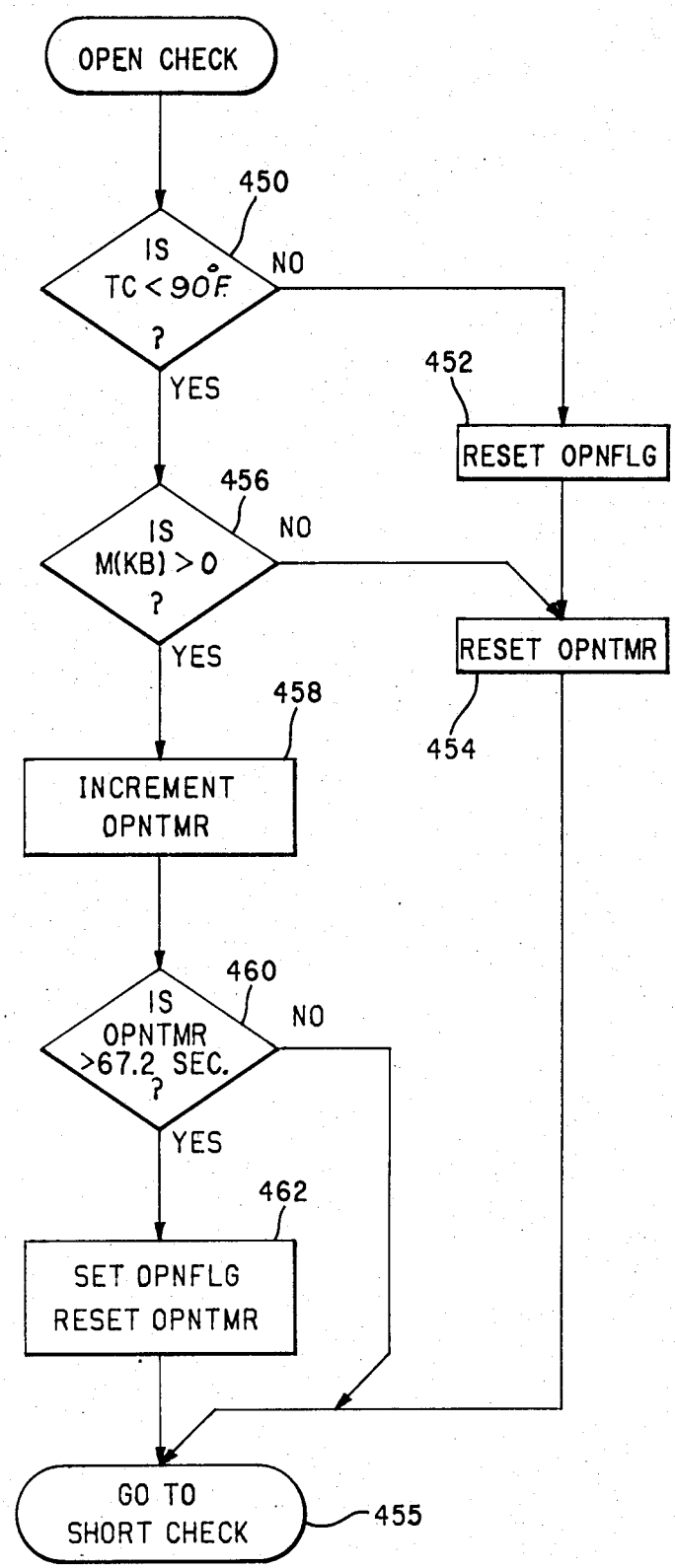
FIG. 13 is a flow diagram of the OPEN CHECK routine incorporated in the control program for the microprocessor in the circuit of FIG. 5.

If KB is not less than 7, Inquiry 366 determines if the sensed utensil temperature exceeds the minimum boil reference temperature of 215° F. (SENOUT>4). If not, power level 15 is set by setting M(KB) to 15 (Block 367) and the program branches (Block 368) to the Open Check routine (FIG. 13). If the sensed utensil temperature is greater than 215°, Inquiry 370 detects the selection of any one of heat settings 7–10 (KB<11). For heat settings 7–10, the appropriate one of steady power levels 8–11, respectively, is set by setting M(KB) to KB+1 (Block 372). The program then branches (Block 368) to the Open Check routine (FIG. 13). Inquiry 374 detects the selection of any one of heat settings 11–13. For these heat settings the appropriate one of power levels 11–13 respectively is set by setting M(KB) to KB (Block 376).

For heat settings 14–15, (KB not less than 14) M(KB) is set to 14 (Block 378) to set the steady state power level at 14 for each of these heat settings. The program then branches (Block 368) to the Open Check routine (FIG. 13).

FRY Routine—FIG. 11

The function of this routine is to implement the Fry Mode. This routine is entered when the user selects the Fry Mode via mode selection switch 22.

Inquiry 390 checks for an OFF setting (KB=0). If OFF is selected, M(KB) is set to zero (Block 392) and the program branches (Block 394) to the Power Out routine, FIG. 13A. Otherwise, Inquiry 396 determines if the Warm setting has been selected (KB 3). If so, the program branches (Block 398) to the Warm routine, FIG. 12. Otherwise, Inquiry 400 compares the sensed utensil temperature SENOUT with the maximum steady state reference temperature for the temperature range for the selected heat setting, which in the Fry Mode is (KB−1). For SENOUT>(KB−1), signifying that the sensed utensil temperature exceeds the desired range, Power Level zero is implemented (Block 392), and the program branches (Block 394) to the Open Check routine (FIG. 13). If the sensed utensil temperature is less than the desired temperature range, an error signal (ERR) is computed (Block 402) as a function of the difference between the desired temperature range represented by (KB−1) and the sensed utensil temperature represented by SENOUT, by computing the difference between KB−1 and SENOUT and dividing the difference by two. After computing the error signal, Inquiries 404–410 determine the selected heat setting. A variable Y, corresponding to the steady state power level for the selected heat setting, is introduced in Blocks 412–420. The error signal (ERR) is summed with steady state power level variable Y to generate a signal representing the power level to be applied, which is temporarily stored in the accumulator (ACC) (Block 422). Inquiry 424 and Block 426 limit the maximum value to 15 in the event the sum of ERR+Y is greater than 15. The value stored in ACC is then transferred to M(KB) to implement the appropriate power level in the Power Out routine and the program branches (Block 394) to the Open Check routine (FIG. 13).

To further speed the temperature response of the system in the Fry Mode, power level 15 is implemented when the sensed utensil temperature is less than 116° F. This is implemented by Inquiry 430 which checks the sensed utensil temperature. If the sensed utensil temperature is less than 116° F. (SENOUT=0), ACC is set to 15 (Block 426), resulting in M(KB) being set to 15 (Block 428), and the program then branches (Block 394) to the Open Check routine, FIG. 13.

WARM Routine—FIG. 12

This routine is entered from the Boil or the Fry routine whenever KB is less than 4 or 3 respectively. The function of this routine is to implement the Warm Mode.

Inquiry 431 determines if KB equals zero corresponding to the OFF power setting. If so, M(KB) is set to zero (Block 434) and the program branches (Block 436) to the Open Check routine (FIG. 13).

For heat settings KB=1 and KB=2, the maximum warm temperature limit is 140° F. corresponding to SENOUT=2. For KB=3, the maximum warm temperature limit is 165° F. corresponding to SENOUT=3. Inquiry 432 checks for KB=1 representing the Wm(1) setting. For KB=1, Inquiry 433 determines if SENOUT is less than 2. If not, M(KB) is set to zero (Block 434) to de-energize the surface unit. If SENOUT is less than 2 signifying a sensed utensil temperature less than the maximum for KB=1, M(KB) is set to 2 (Block 435), and the program branches (Block 436) to the Open Check routine (FIG. 13).

Returning to Inquiry 432, if KB is not equal to one, Inquiry 437 determines if the sensed utensil temperature variable SENOUT is less than KB−1. If SENOUT is less than KB−1, power level 6 is implemented by setting M(KB) to 6 (Block 438). The program then branches (Block 436) to the Open Check routine (FIG. 13).

If the sensed utensil temperature is not less than (KB−1), the program proceeds to Inquiry 439 which checks for the upper temperature limit for KB=2 and KB=3 which is represented by SENOUT=2, and 3 respectively.

If Inquiry 439 determines that the sensed utensil temperature is less than the maximum warm reference temperature for the selected heat setting (SENOUT<KB), M(KB) is set to (KB+1) (Block 440). This implements the steady state power levels 2, 3 and 4 for heat settings 1, 2 and 3, respectively, corresponding to duty cycles of 6.5%, 9% and 12.5%, respectively (See Tables I and II). If the sensed utensil temperature is not less than the maximum warm reference temperature, M(KB) is set to 0 (Block 434) corresponding to the zero or OFF power level. M(KB) having been set, the program then branches (Block 436) to the Open Check routine (FIG. 13).

OPEN CHECK Routine—FIG. 13

The function of this routine is to determine if the temperature sensor circuit has failed in an open circuit mode by comparing the sensed utensil temperature reading to a predetermined reference representative of a temperature lower than the lowest normally occurring steady state sensed utensil temperature for a non-OFF power level applied to the surface unit. If the temperature reading is less than the reference under steady state operating conditions, this signifies that an open circuit condition exists for the sensor circuit. In order to avoid erroneously responding to the low temperature condition as an open circuit failure during the transient heat-up time periods when a heating element is heating up from room temperature to the desired operating temperature, a timer is employed to monitor the duration of the low temperature condition. The reference temperature is set at approximately 90° F. This reference value of 90° F. is selected somewhat arbitrarily, the essential criterion being that the reference represents a temperature less than the lowest sensed utensil temperature associated with normal steady state operation at the lowest heat setting which can be selected by the user. It has been empirically determined that for automatic surface unit 12, during normal operating conditions the sensed utensil temperature will always rise above the 90° F. reference temperature in less than one minute regardless of the power setting selected. Thus, if a low temperature condition persists for more than one minute, the condition is identified as an open circuit failure of the sensor circuit.

A flag designated the OPNFLG flag and a timer designated OPNTMR are utilized in this routine. The OPNFLG flag is set when an open condition is detected and the OPNTMR timer is used to time the duration of the low temperature condition to prevent responding to transient conditions.

Figure 14:
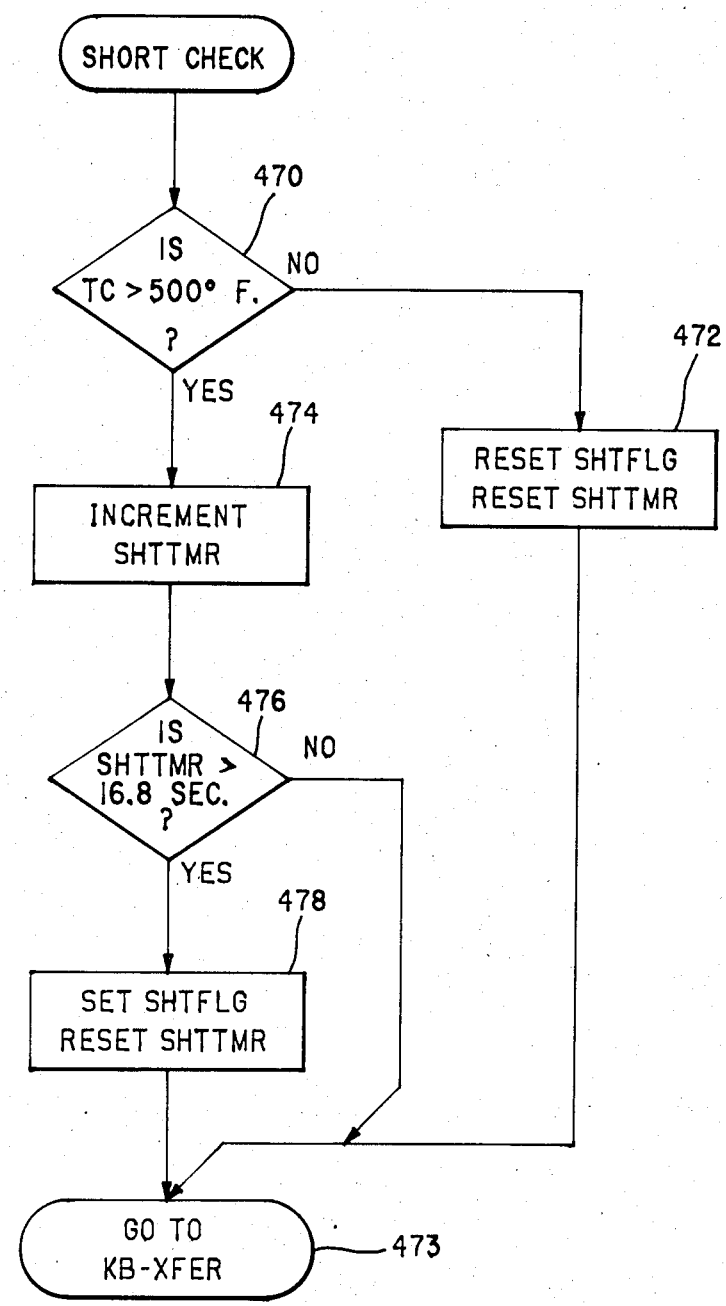
FIG. 14 is a flow diagram of the SHORT CHECK routine incorporated in the control program for the microprocessor in the circuit of FIG. 5.

Referring now to the flow diagram of FIG. 13, it will be recalled that the variable TC is assigned a value representing the sensed utensil temperature in the Temp Input routine. Inquiry 450 determines if the sensed utensil temperature TC is less than 90° F. If the temperature reading is not less than 90° F., the OPNFLG flag is reset (Block 452) and the OPNTMR timer is reset (Block 454) and the program proceeds (Block 455) to the Short Check routine (FIG. 14). If the temperature is less than 90° F., Inquiry 456 checks M(KB) to make sure that a non-OFF power setting has been selected. If M(KB)=0 signifying that the OFF setting has been selected for the automatic surface unit, OPNTMR is reset (Block 454) and the program proceeds to the Short Check routine. If M(KB) is greater than 0, the OPNTMR timer is incremented (Block 458) and Inquiry 460 determines whether the low temperature condition has continued for more than approximately one minute (67.2 seconds). If not, the program proceeds to the Short Check routine. If the time exceeds one minute, the OPNFLG flag is set signifying detection of an open circuit failure and OPNTMR is reset (Block 462). The program then proceeds to the Short Check routine (FIG. 14).

SHORT CHECK Routine—FIG. 14

The function of this routine is to determine if a short circuit condition of the temperature sensor circuit exists, by comparing the digitized value of the temperature input at A1 to a reference temperature corresponding to a temperature greater than the highest temperature which would occur during normal surface unit operation on its highest power setting. In the illustrative embodiment a reference temperature of 500° F. is used. This reference value of 500° F. is selected somewhat arbitrarily, the essential criterion being that the reference represents a temperature greater than the maximum sensed utensil temperature which would occur under normal steady state operating conditions. To prevent an erroneous response to a temporary or transient over-temperature condition, a timer is used to prevent identification of a high temperature condition as a short circuit failure until the condition has continued for a predetermined time period which in the illustrative embodiment is chosen somewhat arbitrarily to be approximately 17 seconds. To this end, a short circuit flag designated SHTFLG and a short circuit timer designated SHTTMR are used in this routine.

Figure 15:
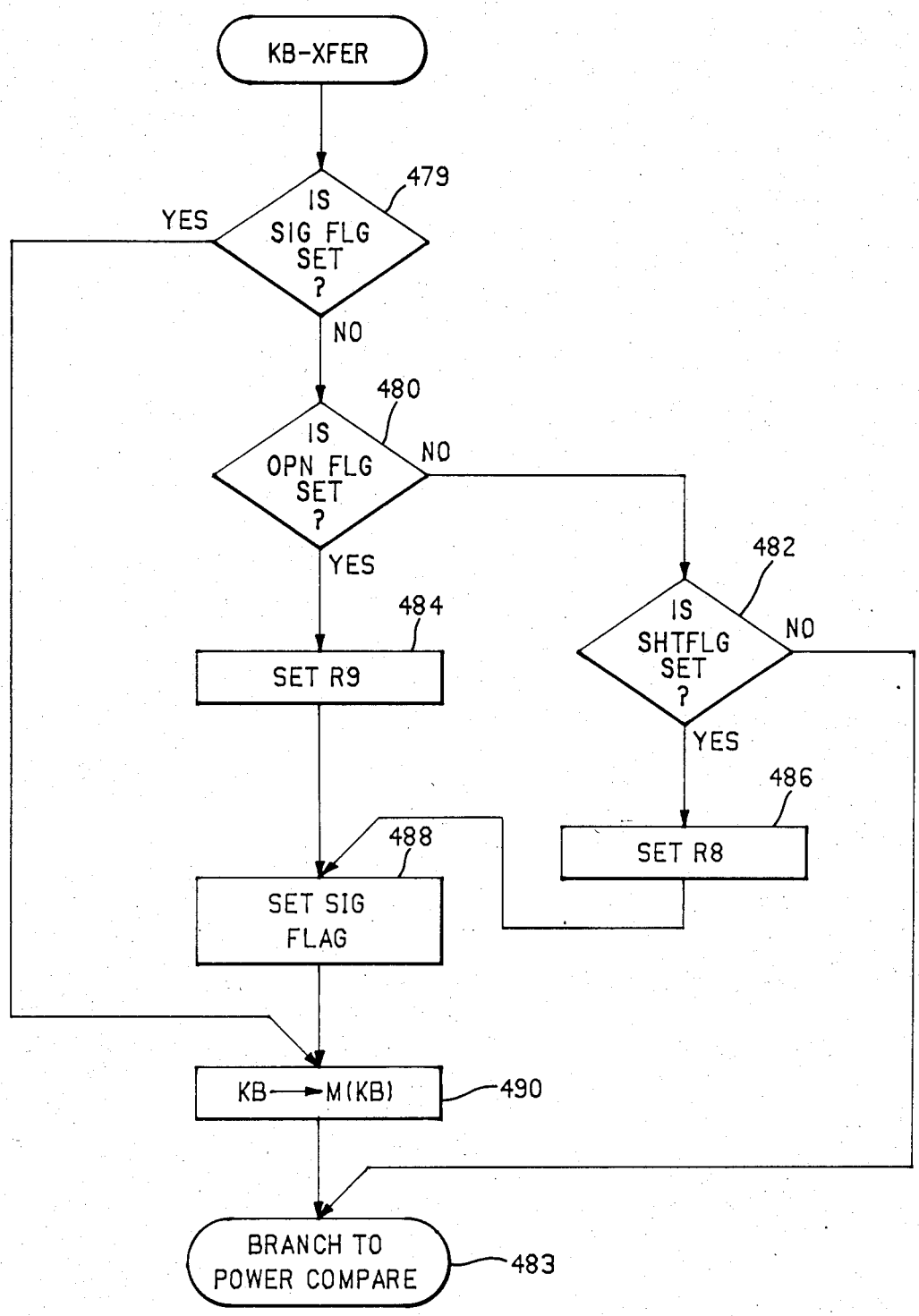
FIG. 15 is a flow diagram of the KB-XFER routine incorporated in the control program for the microprocessor in the circuit of FIG. 5.

Referring to FIG. 14, Inquiry 470 determines if the temperature variable TC from the Temperature Input routine (FIG. 8) is less than 500° F. If the temperature is less than the maximum threshold temperature of 500° F., the SHTFLG flag is reset and the SHTTMR timer is reset (Block 472) and the program proceeds to the KB Transfer routine of FIG. 15 (Block 473). If TC is greater than 500° F., the SHTTMR timer is incremented (Block 474) and Inquiry 476 determines if the condition has existed for more than 16.8 seconds. If SHTTMR is not greater than 16.8 seconds, the program proceeds to the KB-Xfer routine (FIG. 15). If SHTTMR is greater than 16.8 seconds, SHTFLG is set to signify the detection of a short circuit failure condition and SHTTMR is reset (Block 478) and the program branches (Block 473) to the KB-Xfer routine (FIG. 15).

KB-XFER Routine—FIG. 15

The function of this routine is to set the diagnostic displays signifying a temperature sensor circuit failure when appropriate and in the event of such a failure to convert the power control strategy being implemented from the closed loop strategy normally employed for automatic surface unit 12 to the open loop strategy normally employed with regular surface units 14–18. The latter function is accomplished in the event of the detection of an abnormal condition by assigning the KB value representing the particular one of the 16 positions for the control knob selected by the user to the power control variable M(KB) utilized in the Power Compare routine to determine the duty cycle to be implemented for the surface unit.

It will be recalled that when the control program is being executed for the regular surface units 14–18, the program branches from the User Input routine to the Power Compare routine, and the value of M(KB) is simply KB as determined by the position of the associated control knob. However, for the automatic surface unit M(KB) is assigned a value in the appropriate one of the Boil, Fry and Warm routines, which value is a function of KB, and also the sensed utensil temperature SENOUT, in accordance with the closed loop control strategies implemented by these routines.

In this routine, if a sensor circuit failure, either open circuit or short circuit, is detected, the variable M(KB) is assigned the value KB, with the result that the control strategy for surface unit 12 will be the same open loop strategy employed for regular surface units 14–18.

LEDs 120 and 122 (FIG. 5) which constitute the diagnostic display to signify to the user that either an open circuit or short circuit failure has been detected are also controlled in this routine. If an abnormal condition is detected, the appropriate one of these LEDs is energized by an output signal at the appropriate one of output ports R8 and R9 of microprocessor 72. Once an output port is set in this routine signifying the detection of an abnormal condition, it will remain set until power is removed from the system such as by disconnecting the appliance for service. The ports are automatically reset as part of the system power up routine (not shown). Thus, the indicator lights will remain on once set until power is removed from the control circuit. To this end, a flag designated the SIG Flag is used in this routine. The SIG Flag is set upon detection of a fault. This flag is only reset during Power Up of the circuit.

Referring to the flow diagram of FIG. 15, Inquiry 479 checks the state of the SIG Flag. If set, signifying that a fault has been previously detected, the program proceeds directly to Block 490. If not set, Inquiries 480 and 482 check the state of the OPNFLG flag and SHTFLG flag respectively to determine if either an open or short failure of the temperature sensor circuit has been detected. If neither flag is set, the program branches (Block 483) to the Power Compare routine and power control proceeds normally. If the OPNFLG flag is set signifying the detection of an open circuit failure, the open circuit failure display is set by setting output R9 of microprocessor 72 (FIG. 5) (Block 484). Similarly, if the SHTFLG flag is set signifying the detection of a short circuit condition in the temperature sensor circuit, output port R8 of microprocessor 72 is set to trigger the short circuit condition indicator light (Block 486). In the event of the detection of either an open or a short circuit condition, the SIG Flag is set (Block 488). Then the power control variable M(KB) is set equal to the value of the variable KB representing the power setting selected by user manipulation of control knob 26 (Block 490). The program then branches to the Power Compare routine.

Figure 16A:
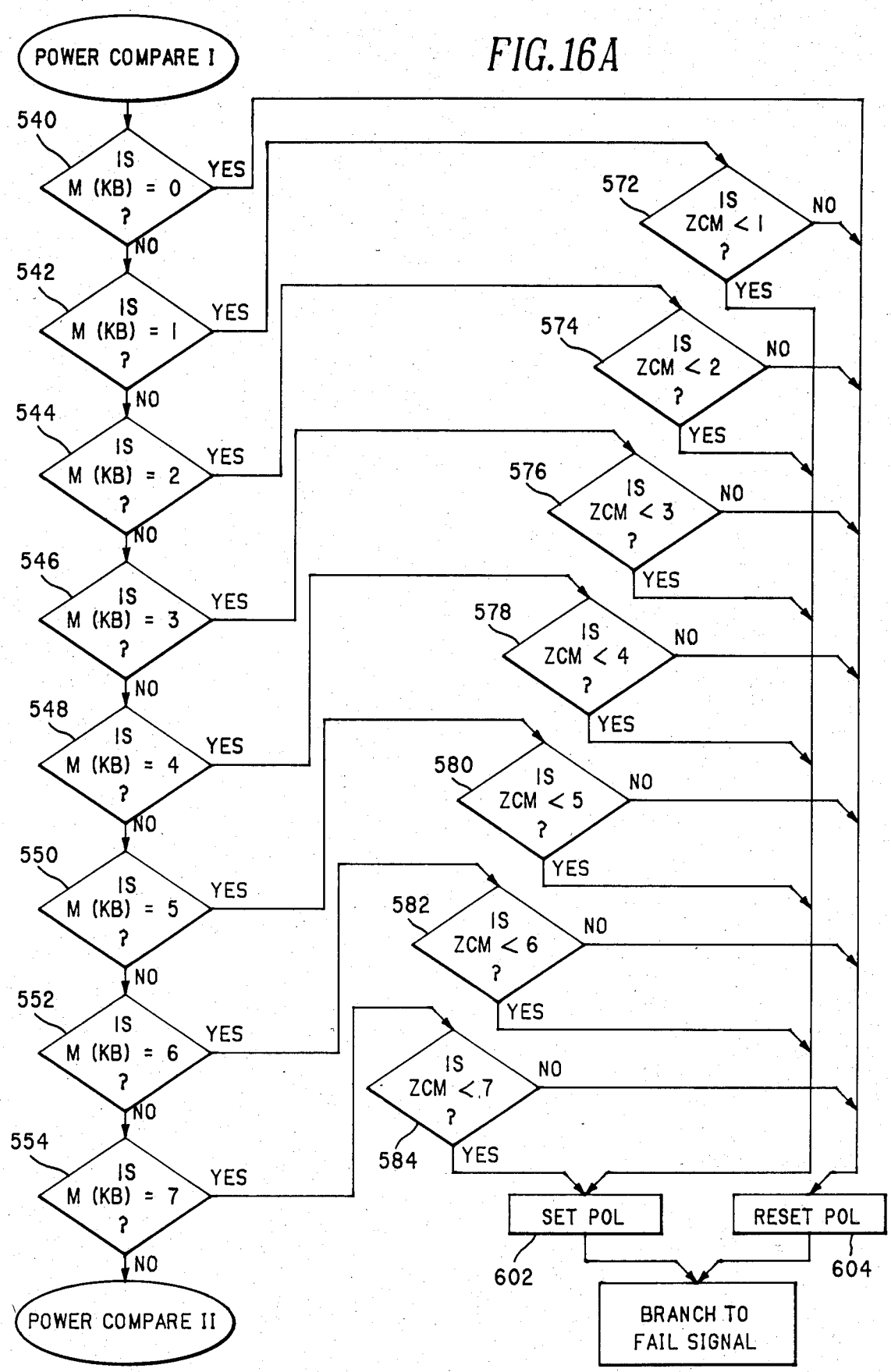
FIGS. 16A and 16B are flow diagrams of the POWER COMPARE routine incorporated in the control program for the microprocessor in the circuit of FIG. 5.
Figure 16B:
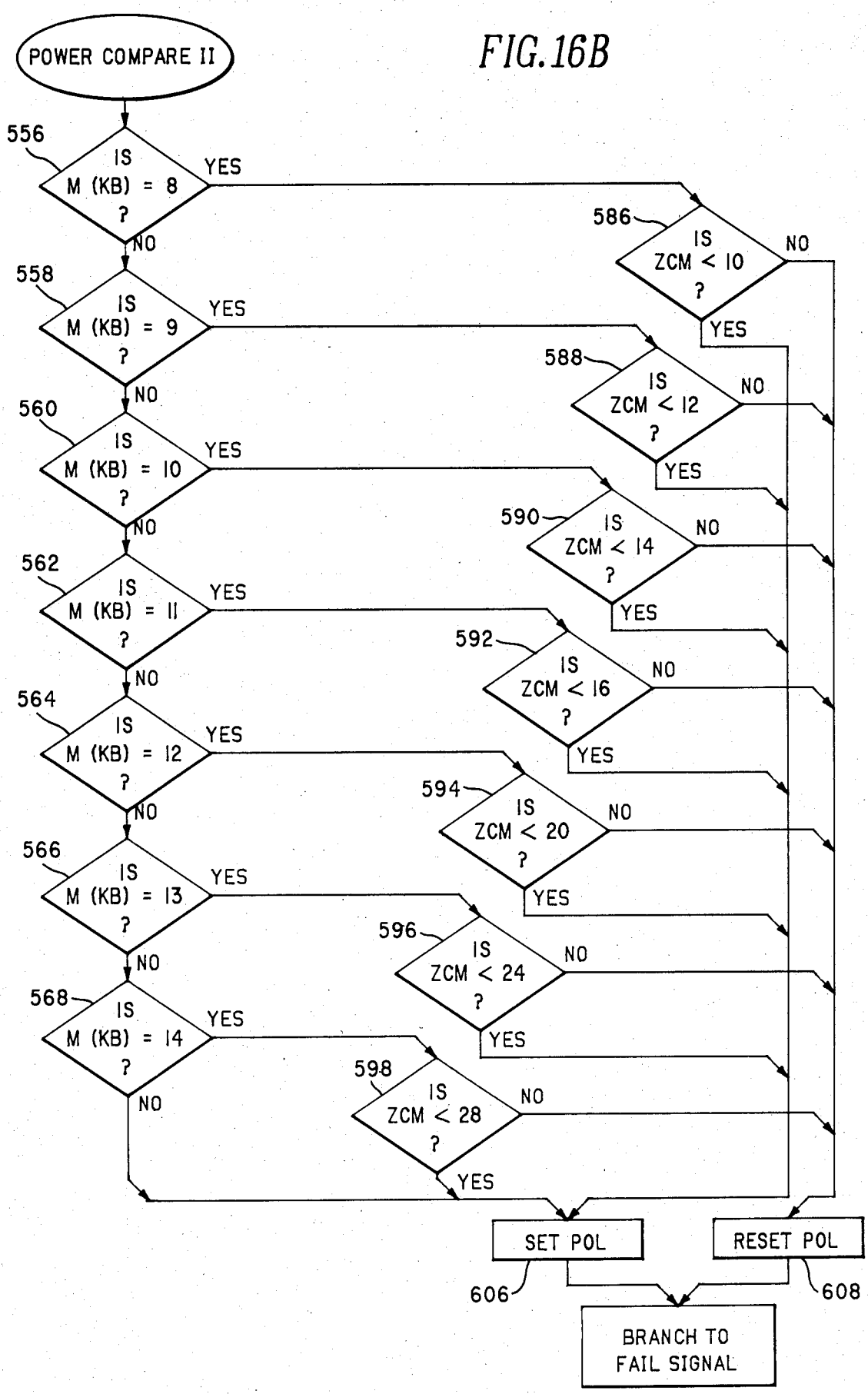

POWER COMPARE Routine—FIGS. 16A and 16B

The function of the Power Compare routine is to determine, based upon the power level designated by M(KB), whether or not the power control triac should be triggered into conduction for the next eight cycle control intervals.

It will be recalled that there are 16 possible power levels including OFF. The % duty cycle for each power level corresponds to the ratio of conductive control intervals to 32, the total number of control intervals in the control period. A ZCM counter functioning as a 32 count ring counter is provided in each RAM file and is incremented once for each pass through the control program for that RAM file. The power control decision is made by comparing the ZCM count with a reference count associated with the power level represented by M(KB). The reference count for each power level represents the number of conductive control intervals per control period corresponding to the desired duty cycle. When the ZCM count is less than the reference, a Power Out Latch (POL) is set, signifying that the associated one of power control triacs 82A-D is to be switched into conduction; otherwise, POL is reset, signifying that the associated power control triac is to be non-conductive.

Referring to FIGS. 16A and B, Inquiries 540–568 determine the value of M(KB). The appropriate one of Inquiries 572–598 corresponding to the identified M(KB) performs the comparison of ZCM to the associated reference count. If ZCM is less than the reference, the Power Out Latch is set by the appropriate one of Blocks 602 and 606, signifying that the surface unit for which the control program is presently executing is to be energized during the next control interval. Otherwise, the Power Out Latch is reset by the appropriate one of Blocks 604 and 608, signifying that associated surface unit is to be de-energized during the next control interval.

Figure 17:
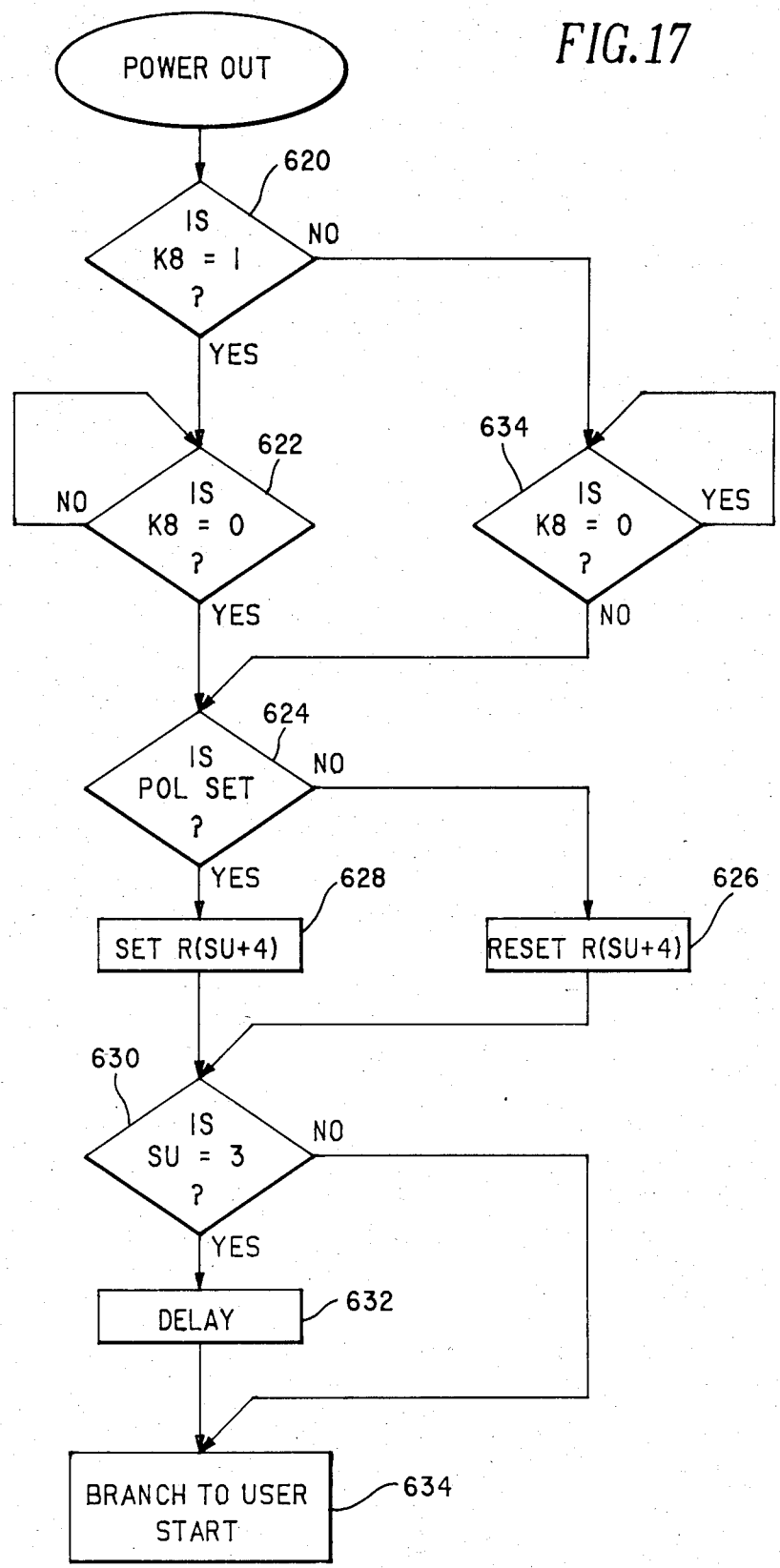
FIG. 17 is a flow diagram of the POWER OUT routine incorporated in the control program of the microprocessor in the circuit of FIG. 5.

Having made the power control decision, the program branches to the Power Out Routine, FIG. 17.

POWER OUT Routine—FIG. 17

It will be recalled from the description of the Start routine (FIG. 6) that the control program is executed for each surface unit sequentially. The variable SU is the indexing variable used to control the sequencing. SU=0,1,2 and 3 identifies which of RAM file and corresponding surface units 18, 16, 14 and 12 respectively is the subject of the current pass through the program.

The function of the Power Out routine is to synchronize the firing of that one of power control triacs 82A-D associated with the surface unit for which the control program is then executing with zero crossings of the 60 Hz AC power signal applied across L1 and L2 (FIG. 5).

Referring now to FIG. 17, input port K8 receives zero crossing pulses from zero crossing detector circuit 100 (FIG. 6). Positive half-cycles are represented by K8=1 and negative half-cycles by K8=0. Inquiry 620 determines the polarity of the present power signal half-cycle. If the signal is presently in a positive half-cycle, (K8=1), Inquiry 622 waits for the beginning of the next negative half-cycle, (K8=0). Upon detection of K8=1, the program proceeds to Inquiry 624. If the answer to Inquiry 620 is NO (K8=0), Inquiry 634 waits for the beginning of the next positive half-cycle (K8=1), then proceeds to Inquiry 624.

Inquiry 624 checks the state of the Power Out Latch (POL). If POL is reset, signifying that the corresponding surface unit is not to be energized during the next control interval, the appropriate output port identified by the index variable SU+4 (R(SU+4) identifies R4, R5, R6 and R7 for SU=0, 1, 2 and 3 respectively) is reset (Block 626); if POL is set, signifying that the corresponding surface unit is to be energized, R(SU+4) is set (Block 628).

Inquiry 630 causes the control program to return directly to the Start routine to repeat the program for the next surface unit until SU equals 3 signifying that execution has been completed for all four surface units. When SU equals 3, the program delays (Block 632) until the beginning of the next control interval. In the illustrative embodiment, execution of the control program uses one-half cycle of the power signal for each pass. Thus, execution for all four units is completed in the first two cycles of the power signal. The duration of the control interval is eight cycles. Block 632 delays the program for six cycles after which the program branches (Block 634) to Start to begin execution for the next control interval.

While in accordance with the Patent Statutes, a specific embodiment of the present invention has been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. In a cooking appliance of the type having heater means for heating a cooking utensil, user input selection means for enabling the user to select a desired heating level for said heater means, and temperature sensing means operative to sense the temperature of the utensil being heated by said heater means, an improved control arrangement comprising:

control means responsive to the temperature sensing means and the user input selection means, operative under normal operating conditions to control energization of the heater means in accordance with a closed loop control strategy as a function of a sensed utensil temperature and the user selected setting;

said control means including means for detecting an abnormal operating condition for said temperature sensing means;

said control means being operative in response to detection of said abnormal condition to operate said heater means in accordance with an open loop control strategy as a function of the user selected setting independently of the sensed temperature, whereby the closed loop temperature control arrangement converts to an open loop power control arrangement upon detection of a temperature sensing means failure.

2. A control arrangement according to claim 1 further comprising means responsive to said control means for providing a user discernible signal upon detection of said abnormal operating condition to inform the user that a failure has been detected.

3. A control arrangement according to claim 1 wherein said means for detecting an abnormal operating condition for said sensing means comprises means for comparing the sensed utensil temperature to a first reference corresponding to a temperature higher than the highest sensed temperature likely to occur during normal operation and to a second reference corresponding to a temperature lower than the lowest sensed temperature likely to occur during normal operation, and operative to recognize an abnormal operating condition upon detecting a sensed utensil temperature greater than said first reference or less than said second reference.

4. A control arrangement according to claim 3 wherein said means for detecting an abnormal operating condition for said sensing means further comprises timing means initiated in response to detection of a sensed utensil temperature greater than said first reference or less than said second reference and wherein said detecting means is responsive to said timing means and operative to recognize an abnormal condition when a sensed utensil temperature is greater than said first reference for a time period longer than a first predetermined reference time or said sensed utensil temperature is less than said second reference for a time period greater than a second predetermined time, said first and second predetermined reference times being of sufficient duration to prevent normal transient conditions from being erroneously identified as abnormal operating conditions for said temperature sensing means.

5. A control arrangement according to claim 3 further comprising means responsive to said control means for providing a first user discernible signal indicative of a short circuit failure upon detection of a sensed utensil temperature greater than said first reference and a second user discernible signal indicative of an open circuit failure upon detection of a sensed utensil temperature less than said second reference.

6. A control arrangement according to claim 4 further comprising means responsive to said control means for providing a first user discernible signal indicative of a short circuit failure upon detection of a sensed utensil temperature greater than said first reference and a second user discernible signal indicative of an open circuit failure upon detection of a sensed utensil temperature less than said second reference.

7. In a cooking appliance of the type having at least one regular surface unit and at least one automatic surface unit equipped with a temperature sensor circuit for sensing the temperature of a utensil being heated thereon, and user input selection means enabling the user to select a heat setting for each surface unit, an improved control arrangement comprising:

control means operative under normal operating conditions to control energization of the regular surface unit in accordance with an open loop control strategy as a function of the user selected heat setting and to control energization of the automatic surface unit in accordance with a closed loop control strategy as a function of the user selected heat setting and the sensed utensil temperature;

said control means including diagnostic means for detecting an abnormal operating condition for the temperature sensor circuit;

said control means being operative in response to detection of said abnormal operating condition to control energization of the automatic surface unit in accordance with said open loop control strategy as a function of user heat setting;

whereby in the event of a temperature sensor circuit failure, the automatic surface unit becomes operative as a regular surface unit.

8. A control arrangement according to claim 7 further comprising means responsive to said control means for providing a user discernible signal upon detection of said abnormal operating condition to inform the user that a sensor circuit failure has been detected, and that the corresponding automatic surface unit is operating as a regular surface unit.

9. A control arrangement according to claim 7 wherein said means for detecting an abnormal operating condition for said sensor means comprises means for comparing the sensed utensil temperature to a first reference representative of a temperature higher than the highest sensed temperature likely to occur during normal operation and to a second reference representative of a temperature lower than the lowest sensed temperature likely to occur during normal operation, and said detecting means being operative to recognize an abnormal sensor circuit condition upon detecting a sensed utensil temperature greater than said first reference or less than said second reference.

10. A control arrangement according to claim 9 wherein said means for detecting an abnormal operating condition for said sensor means further comprises timing means initiated in response to detection of sensed utensil temperature greater than said first reference or less than said second reference and wherein said detecting means is responsive to said timing means and operative to recognize an abnormal condition when a sensed utensil temperature is greater than said first reference for a time period longer than a first predetermined time period or said sensed utensil temperature is less than said second reference for a time period greater than a second predetermined time period, said first and second predetermined time periods being of sufficient duration to prevent normal transient conditions from being erroneously identified as abnormal temperature sensor circuit operating conditions.

11. A control arrangement according to claim 9 further comprising means responsive to said control means for providing a first user discernible signal indicative of a short circuit sensor circuit failure upon detection of a sensed temperature greater than said first reference and a second user discernible signal indicative of an open circuit sensor circuit failure upon detection of a sensed utensil temperature less than said second reference.

12. A control arrangement according to claim 10 further comprising means responsive to said control means for providing a first user discernible signal indicative of a short circuit sensor circuit failure upon detection of a sensed temperature greater than said first reference and a second user discernible signal indicative of an open circuit sensor circuit failure upon detection of a sensed utensil temperature less than said second reference.

13. In a cooking appliance of the type having a heating means for heating the contents of a cooking utensil, a temperature sensor circuit for monitoring the utensil temperature, user input selector means for enabling the user to select one of a plurality of heat settings associated with a utensil temperature range and means for controlling the heating level of the heating means under normal conditions in accordance with a closed loop control strategy as a function of the sensed utensil temperature and the selected temperature setting, a method for detecting a failure of the sensor circuit and responding thereto comprising the steps of:
   at least periodically sampling the output of the temperature sensor circuit monitoring the temperature of the utensil being heated by the appliance;
   comparing the sensed temperature sample to a first reference greater than the highest normally occurring sensed utensil temperature and to a second reference less than the lowest normally occurring sensed utensil temperature; and
   operating the heater means in accordance with an open loop control strategy as a function of the selected setting independently of the sensed utensil temperature, if the sensed utensil temperature is greater than the first reference temperature or less than the second reference temperature.

14. The method of claim 13 further comprising the step of generating a user discernible signal if the sensed utensil temperature is greater than the first reference temperature or less than the second reference temperature to inform the user that an abnormal sensor condition has been detected.

15. The method of claim 13 further comprising the steps of generating a first user discernible signal indicative of a short circuit failure of the temperature sensor circuit if the sensed temperature is greater than the first reference and generating a second user discernible signal indicative of an open circuit failure of the temperature sensor circuit if the sensed temperature is less than the second reference.

16. In a cooking appliance of the type having at least one regular surface unit and at least one automatic surface unit equipped with a utensil temperature sensor, user input selector means enabling the user to select one of a plurality of heat settings for each surface unit, and control means operative to control energization of the regular surface unit in accordance with an open loop control strategy as a function of the selected heat setting and to control energization of the automatic surface unit in accordance with a closed loop control strategy as a function of the selected heat setting and the sensed utensil temperature, a method for detecting a temperature sensor circuit failure and responding thereto comprising the steps of:
   at least periodically sampling the utensil temperature;
   comparing the utensil temperature samples to a first reference representing a temperature greater than the highest normally occurring utensil temperature and to a second reference representing a temperature less than the lowest normally occurring utensil temperature; and
   controlling energization of the automatic surface unit in accordance with the open loop control strategy as a function of the selected heat setting when the utensil temperature sample is greater than the first reference or less than the second reference.

17. The method of claim 16 further comprising the step of generating a user discernible signal if the sensed utensil temperature is greater than the first reference or less than the second reference to inform the user that an abnormal sensor circuit condition has been detected and the corresponding automatic surface unit is operating as a regular surface unit.

18. The method of claim 16 further comprising the steps of generating a first user discernible signal indicative of a short circuit failure of the temperature sensor circuit if the sensed temperature is greater than the first reference and generating a second user discernible signal indicative of an open circuit failure of the temperature sensor circuit if the sensed temperature is less than the second reference temperature.

19. In a cooking appliance of the type having a heating means for heating the contents of a cooking utensil, a temperature sensor circuit for monitoring the utensil temperature, user input selector means for enabling the user to select one of a plurality of heat settings associated with a utensil temperature range and means for controlling the heating level of the heating means under normal conditions in accordance with a closed loop control strategy as a function of the sensed utensil temperature and the selected temperature setting, a method for detecting a failure of the sensor circuit and responding thereto comprising the steps of:
   at least periodically sampling the output of the temperature sensor circuit monitoring the temperature of the utensil being heated by the appliance;
   comparing the sensed temperature samples to a first reference representing a temperature greater than the highest normally occurring sensed utensil temperature and to a second reference representing a temperature less than the lowest normally occurring sensed utensil temperature;
   timing the period during which the sensed utensil temperature is greater than the first reference or less than the second reference; and
   operating the heater means in accordance with an open loop control strategy as a function of the selected setting independently of the sensed utensil temperature, if the sensed utensil temperature is greater than the first reference for a time period greater than a first predetermined reference time or less than the second reference for a time period greater than a second predetermined reference time.

20. The method of claim 19 further comprising the steps of generating a first user discernible signal indicative of a short circuit failure of the temperature sensor circuit if the sensed temperature is greater than the first reference for a time period greater than the first reference time and generating a second user discernible signal indicative of an open circuit failure of the temperature sensor circuit if the sensed temperature is less than the second reference for a time period greater than the sensed reference time.

* * * * *